(12) United States Patent
Tomlinson et al.

(10) Patent No.: US 8,891,763 B2
(45) Date of Patent: Nov. 18, 2014

(54) PUBLIC KEY ENCRYPTION SYSTEM USING ERROR CORRECTING CODES

(76) Inventors: Martin Tomlinson, Devon (GB); Cen Jung Tjhai, Plymouth (GB)

( * ) Notice: Subject to any disclaimer, the term of this patent is extended or adjusted under 35 U.S.C. 154(b) by 0 days.

(21) Appl. No.: 13/297,042

(22) Filed: Nov. 15, 2011

(65) Prior Publication Data
US 2012/0121084 A1  May 17, 2012

(30) Foreign Application Priority Data

Nov. 16, 2010 (GB) ................................ 1019346.4

(51) Int. Cl.
*H04L 29/06* (2006.01)
*H04L 9/30* (2006.01)

(52) U.S. Cl.
CPC . *H04L 9/30* (2013.01); *H04L 9/304* (2013.01)
USPC .......................................................... 380/30

(58) Field of Classification Search
CPC ................................. H04L 9/30; H04L 9/304
USPC ........................................................... 380/30
See application file for complete search history.

(56) References Cited

U.S. PATENT DOCUMENTS

| 5,054,066 A | 10/1991 | Riek et al. |
|---|---|---|
| 2005/0117745 A1 | 6/2005 | Lee et al. |
| 2009/0125780 A1* | 5/2009 | Taylor et al. ................... 714/752 |
| 2009/0254981 A1 | 10/2009 | Devadas et al. |
| 2009/0323928 A1* | 12/2009 | Kerschbaum et al. .......... 380/28 |
| 2010/0086132 A1 | 4/2010 | Tavernier et al. |
| 2010/0088511 A1 | 4/2010 | Tavernier et al. |
| 2010/0279610 A1* | 11/2010 | Bjorhn et al. ................. 455/41.2 |
| 2011/0091033 A1 | 4/2011 | Michiels et al. |

FOREIGN PATENT DOCUMENTS

| FR | 2912019 A1 | 8/2008 |
|---|---|---|
| FR | 2912020 A1 | 8/2008 |
| GB | 2469393 B | 2/2011 |
| WO | 01/50675 A2 | 7/2001 |
| WO | 2007/037869 A1 | 4/2007 |

OTHER PUBLICATIONS

The Combined Search and Examination Report from the UK Intellectual Property Office dated Nov. 24, 2010 for priority application GB1019346.4.
The Search Report under Section 17 from UK Intellectual Property Office dated Aug. 23, 2010 for related application GB1006747.8.

(Continued)

*Primary Examiner* — Jeffrey D Popham
(74) *Attorney, Agent, or Firm* — Procopio, Cory, Hargreaves & Savitch LLP

(57) ABSTRACT

This invention provides improved security and improved throughput of the McEliece public key encryption system and reduces the public key size. Even though the public key is reduced, in some embodiments of the invention the ensemble of cryptograms produced is identical to the ensemble of cryptograms produced by the original system for a given Goppa code, and the same private key. It is possible using this invention that the encrypted message, the cryptogram is a truly random function, not a pseudo random function of the message so that even with the same message and the same public key, a different, unpredictable cryptogram is produced each time. Other embodiments of the invention use a shortened error correcting code allowing the length of the generated cryptogram to match exactly the available transmission or storage media such as is the case of RFID and packet based radio applications.

37 Claims, 22 Drawing Sheets

(56) References Cited

OTHER PUBLICATIONS

The Notification of Grant from the UK Intellectual Property Office dated Jan. 18, 2011 for related application GB1006747.8 (GB2469393).
The International Search Report and Written Opinion mailed Oct. 6, 2011 for related PCT/GB2011/000636.
N.J. Patterson. "The Algebraic Decoding of Goppa Codes." IEEE Transactions on Information Theory. 21(2):203-207 (Mar. 1975).
Charles T. Retter. "Decoding Goppa Codes with a BCH Decoder." IEEE Transactions on Information Theory. IT-21:112, Jan. 1975.
Yasuo Sugiyama et al. "An Erasures-and-Errors Decoding Algorithm for Goppa Codes." IEEE Transactions on Information Theory. IT-22:238-241, Mar. 1976.
Yuan Xing Li et al. "On the Equivalence of McEliece's and Niederreiter's Public-Key Cryptosystems." IEEE Transactions on Information Theory. 40(1):271-273 (Jan. 1994).
M.C. Lin et al. "Information Rate of McEliece's Public-Key Encryption." Electronic Letters. 26(1): 16-18 (Jan. 4, 1990).
C.S. Park. "Improving Code Rate of McEliece's Public-Key Cryptosystem." Electronics Letters. 25(21):1466-1467 (Oct. 12, 1989).
John P. Jordan. "A Variant of a Public Key Cryptosystem Based on Goppa Codes." ACM SigAct News 15(1):25-30 (1983).
Thierry P. Berger et al. "Reducing Key Length of the McEliece Cryptosystem." Proceedings of the 2nd International Conference on Cryptography in Africa: Progress in Cryptology. pp. 77-97, 2009. http://www.unilim.fr/pages_perso/philippe.gaborit/reducing.pdf. Originally accessed Nov. 23, 2010 by the Examiner for priority application No. GB 1019346.4.
R.J. McEliece. "A Public-Key Cryptosystem Based on Algebraic Coding Theory." DSN Progress Report 42-44. pp. 114-116 (Jan. and Feb. 1978).
V. D. Goppa. "A New Class of Linear Error-Correcting Codes." Probl. Inform. Transm. 6:24-30 (1970). (in Russian).
Rivest et al. "A Method for Obtaining Digital Signatures and Public-Key Cryptosystems." Communications of the ACM 21(2):120-126 (1978).
Daemen et al. "The Design of Rijndael: AES—The Advanced Encryption Standard." Springer, 2002 (pp. 1-51).
The Response Made to Report under Section 18(3) from the UK Intellectual Property Office dated Jan. 21, 2011 for priority application GB 1019346.4.
A.J. Menezes et al. "McEliece Public Key Encryption." CRC Press, Chapter 8, Section 8.5, pp. 298-299. Oct. 1996. Retrieved from http://www.cacr.math.uwaterloo.ca/hac/about/chap8.pdf. Originally accessed Nov. 22, 2010 by the Examiner for priority application No. GB 1019346.4.
P.L. Cayrel et al. "McEliece/Niederreiter PKC: Sensitivity to Fault Injection." 5th International Conference on Future Information Technology. May 21-23, 2010 pp. 1-6. INSPEC Accession No. 11365495.
Bhaskar Biswas. "Hybrid McEliece." Code-Based Crypto, INRIA. Nov. 13, 2008. http://www-rocq.inria.fr/secret/CBCrypto/index.php?pg=hymes. Originally accessed Nov. 23, 2010 by the Examiner for priority application No. GB 1019346.4.
Menezes et al, "Handbook of Applied Cryptography." Chapter 8, "McEliece public key encryption," pp. 283-319. CRC Press, Oct. 1996. Retrieved from http://www.cacr.math.uwaterloo.ca/hac/about/chap8.pdf.
Grassl et al. "Codes for the Quantum Erasure Channel." Physical Review A. 56(1):33-38 (Jul. 1997).

* cited by examiner

PUBLIC KEY ENCRYPTION SYSTEM USING ERROR CORRECTING CODES

REFERENCE TO RELATED APPLICATIONS

This application claims priority from GB Application No. 1019346.4, filed 16 Nov. 2010, published as GB 2473154, the entire content of which is incorporated herein by reference.

DESCRIPTION OF THE BACKGROUND ART AND INTRODUCTION

Public key encryption is an established technology invented in 1977 by Rivest, Shamir and Adleman [1], and is known as RSA. It is based on the considerable difficulty of factorizing large integers into prime factors. In RSA a large integer N which forms part of the public key is constructed from the product of two large prime numbers $P_1$ and $P_2$ which must be kept secret. An arbitrary integer e is chosen and the public key consists of N and e. The security of RSA is compromised if $P_1$ and $P_2$ are determined and this can be done, at least in theory, by factorising N. In typical implementations of RSA, N consists of a 1024 bit number which is predicted to be factorisable in practice within a few years with advances in computer technology. Longer numbers may be used such as 2048 bit numbers but alternative Public key systems based on different methods are likely to become more important.

One such public key system is the McEliece system [2] invented by the distinguished mathematician Robert McEliece in 1978 and it is based on the family of Goppa [3] error correcting codes and the difficulty of correcting unknown random errors if the particular Goppa code used in generating the public and private keys is unknown. A cleartext message is encoded into binary codewords using the public key and a randomly chosen error pattern containing up to t bits is added to each codeword. In decryption the associated private key is used to invoke an error correcting decoder based upon the underlying Goppa code to correct the errored bits in each codeword, prior to retrieval of the cleartext message.

In U.S. Pat. No. 5,054,066, Riek and McFarland improved the security of the system by complementing the error patterns so as to increase the number of errors contained in the cryptogram [4]. In GB1006747.8, published as GB2469393, Tjhai and Tomlinson (the present inventors) modified the original McEliece system and placed the emphasis on the error pattern so that the encryption system became semantically secure. Encrypting the same message using the same public key produces a completely different cryptogram with this system.

One of the criticisms of the McEliece system is that the public key is much larger than the corresponding RSA public key. There have been several attempts to modify the system using different error correcting codes so as to reduce the public key size such as that described by Berger et al [5] but in all cases the security of the system has been compromised.

One objective of the current invention is to reduce the public key size without compromising the security of the encryption system and to retain the family of Goppa error correcting codes as the basis of the encryption system. A further objective of the invention is to be able to exploit the implicit error correction capability so as to deal with naturally occurring errors in the transmission or retrieval of cryptograms, given the constraint of reduced public key size.

BRIEF SUMMARY OF THE INVENTION

In the originally proposed public key encryption system [2] a codeword is generated from message bits by using a permuted, scrambled generator matrix of a Goppa code [3] of length n symbols, capable of correcting t errors. This matrix is the public key. The digital cryptogram is formed from codewords corrupted by exactly t randomly, or t pseudorandomly, chosen bit errors. The security is provided by the fact that it is impossible to remove the unknown bit errors unless the original unpermuted Goppa code, the private key, is known in which case the errors can be removed by correcting them and then recovering the original message by descrambling the information bits in the codeword. In the original example given in [2], the codeword length n is 1024 and t is 50. The number of possible error combinations is $3.19 \times 10^{85}$ equivalent to a secret key of length 284 bits.

In preferred embodiments of this invention the public key does not contain the permuted, scrambled generator matrix as in the original system but contains the parity bit part of a new generator matrix derived from linear row combinations of the permuted, scrambled generator matrix of the original system. Codewords of the original system are encoded by using a non-systematic binary code [2], but in this invention codewords are encoded using a systematic binary code [6]. However it is a feature of one embodiment of the invention that for a given Goppa code and permutation matrix the ensemble of all codewords generated by the original system is identical to the ensemble of all codewords generated by the invention.

As cryptograms are simply codewords plus random errors it follows that the ensemble of all cryptograms generated by the original system is identical to the ensemble of all cryptograms generated by the invention. It follows that at least for this embodiment, the invention will retain the encryption security of the original system but with a smaller public key.

It should be noted that in this case whilst the ensemble of all cryptograms generated is identical to the ensemble of all cryptograms generated by the original system, a given message (and error pattern) will produce a different cryptogram to that generated by the original system. Furthermore a preferred feature is provided by using a similar technique to that described in GB1006747.8 (GB2469393) by the present inventors, Tjhai and Tomlinson, which is incorporated herein by reference, in that the bits comprising the message are scrambled, or they are symmetric key encrypted, prior to encoding using the public key. The scrambling features, or the symmetric key to be used may be either fixed or may be defined by the error pattern depending upon the application of the invention.

As described in U.S. Pat. No. 5,054,066, Riek and McFarland, the original McEliece system [2] can be modified to correct any errors that occur in the transmission or the retrieval of the cryptogram. In certain embodiments of this invention, with reduced public key, additional errors introduced in the cryptogram by transmission errors or from writing/reading errors are corrected automatically allowing the message to be retrieved if the private key is known.

In other embodiments of the invention the error patterns are derived from a combination of information contained in a scrambled second message stream and the output of a random number generator improving the information throughput efficiency of the public key encryption system.

In another embodiment of the invention the public key corresponds to a shortened error correcting code which enables the length of the cryptogram to be exactly matched to the transmission or storage media available for a given application.

The invention may be used in a wide number of different applications such as message services, e-mail applications, mobile telephony, wireless communications, active and passive RFID, secure bar-codes, secure ticketing, magnetic cards, digital broadcasting, general digital communications, video communications and digital storage. Encryption and decryption is amenable to high speed implementation operating at speeds beyond 1 Gbit/sec.

BRIEF DESCRIPTION OF THE DRAWINGS

Embodiments of the invention will now be illustrated, by way of example only, with reference to the accompanying drawings in which.

DETAILED DESCRIPTION OF PREFERRED EMBODIMENTS

The security strength of most embodiments of the invention as in the original McEliece public Key encryption system stems from the fact that a truly random binary error pattern is added to the encoded message as part of the digital cryptogram. Even with the same message and the same public key a different digital cryptogram is produced each time the message is encrypted. Each message is encoded with a scrambled, binary mapped, permuted, version of a $GF(2^m)$ Goppa code. Without the knowledge of the particular Goppa code that is used, the error patterns cannot be corrected and the messages cannot be recovered. It is not possible to deduce which particular Goppa code is being used from the public key, which is the matrix used for encoding, because this matrix is a scrambled, permuted version of the original encoding matrix of the Goppa code, plus the fact that for a given m there are an extremely large number of Goppa codes [2].

Figure 1:
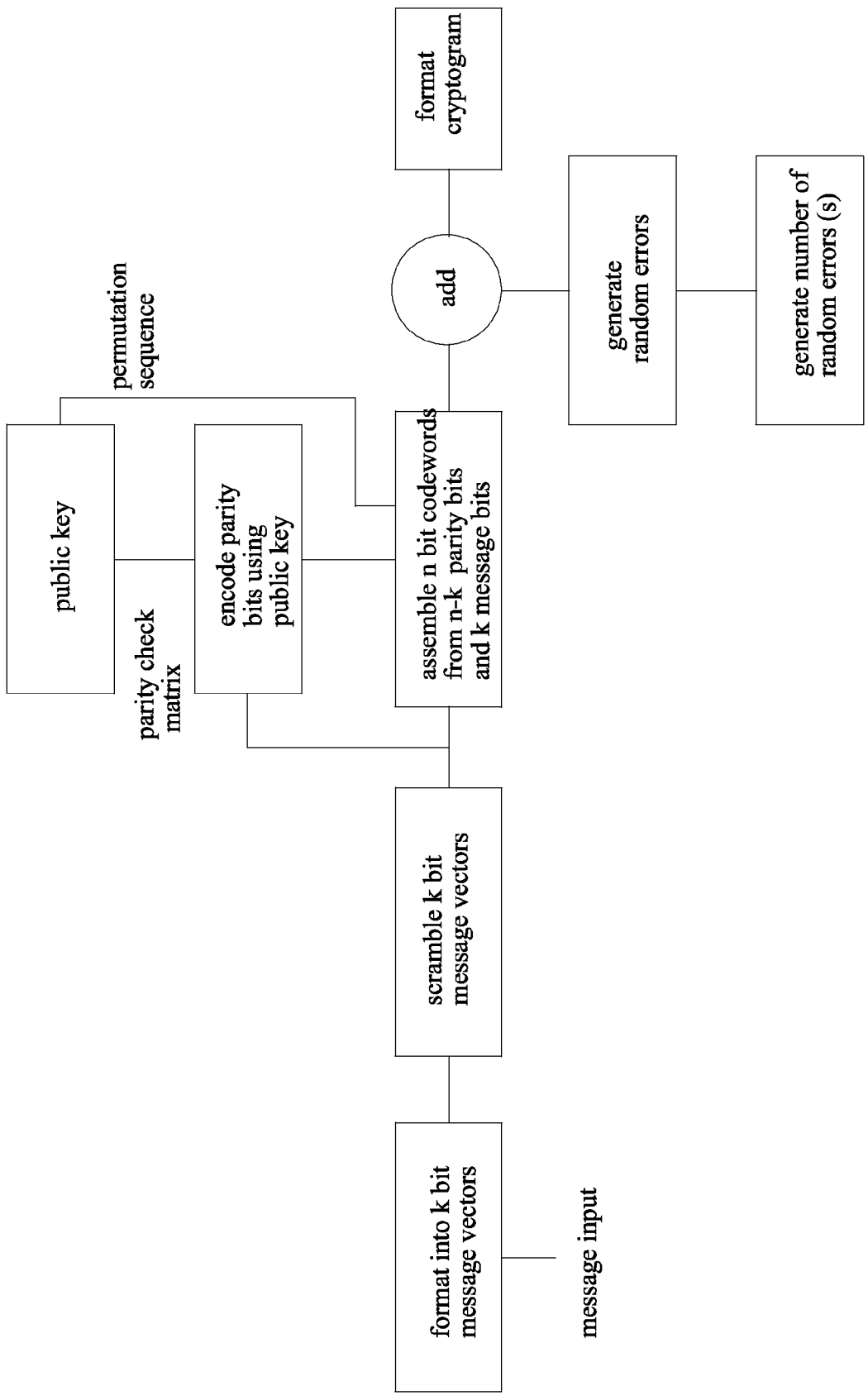
FIG. 1 shows a Public key encryption system according to an embodiment of the invention.

The method of encryption in one embodiment of the invention is shown in FIG. 1, in which blocks represent code modules such as subroutines or function calls, executed by programmable hardware. The apparatus for performing the method comprises a chipset provided in a mobile phone or other portable communications device which includes a central processing unit (a CPU or processor), a program storage carrier medium such as Flash or EPROM memory, random access memory for performing calculations, and data reception and transmission hardware devices including modems and codecs. Optionally, a reader such as a USB port or card reader, or disc drive for removable media, is included—in such case, the removable media may contain the operating program for causing the above-described hardware to perform the functions set forth below.

The message information to be sent, if not in digital form, is digitally encoded into binary form comprising a sequence of information bits. The message comprising a sequence of information bits is formatted by appending dummy bits as necessary into an integral number m of binary message vectors of length k bits each. This is carried out by the block format into k bit message vectors shown in FIG. 1. Each k bit message vector is scrambled using a fixed scrambler and n−k parity bits encoded from the scrambled k bit message vector by the block encode parity bits using public key shown in FIG. 1. Using each scrambled k bit message vector and the associated n−k parity bits, n bit codewords are assembled by the block assemble n bit codewords from n−k parity bits and k message bits into codewords, n bits long. The codewords are defined by a systematic error correcting code which is derived from a permuted binary Goppa code and a scrambling matrix. The binary Goppa code is derived itself from a non-binary Goppa code and the procedure for generating the binary code, the public key and the private key is described below for a specific example.

The parity check matrix which is used to encode the n−k parity bits of each codeword is defined by the public key which is stored in a buffer memory, shown as public key in FIG. 1. A random number generator generates a number s internally constrained to be less than or equal to t, the number of bit errors that the Goppa code can correct, and this is carried out by the block generate number of random errors(s) as shown in FIG. 1.

The number of random errors s is input to generate random errors which for each codeword, initialises an n bit buffer memory with zeros, and uses a random number generator to generate s 1's in s random positions of the buffer memory. The contents of the n bit buffer are added to the codeword of n bits by the block add shown in FIG. 1. The 1's are added modulo 2 which inverts the codeword bits in these positions so that these bits are in error. In FIG. 1, the block format cryptogram takes the sequence of corrupted codewords as input and appends these together, together with formatting information to produce the cryptogram.

Figure 2:
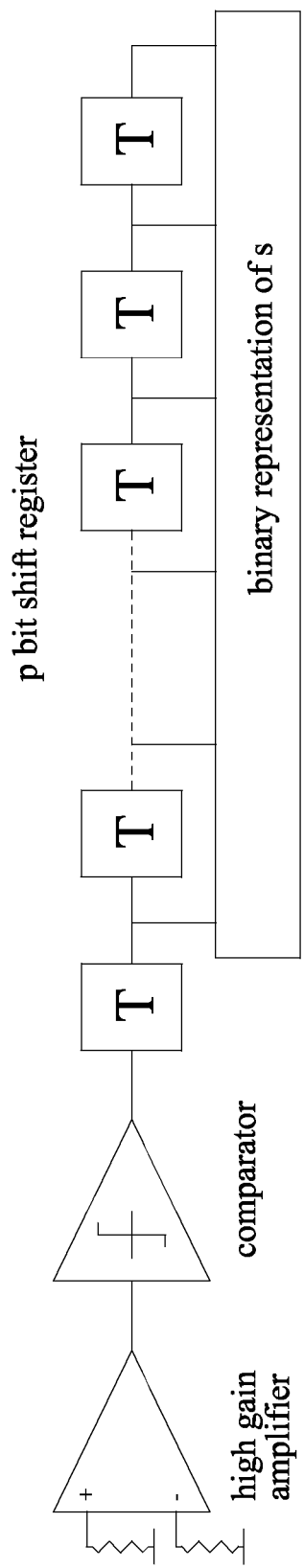
FIG. 2 shows a Random integer generator of the number of added, random bit errors, s according to an embodiment of the invention.

The highest level of security is provided by the block generate number of random errors(s) of FIG. 1 being a truly random number generator and not a pseudo random generator. An example of a random number generator is shown in FIG. 2.

The differential amplifier, with high gain amplifies the thermal noise generated by the resistor terminated inputs. The output of the amplifier is the amplified random noise which is input to a comparator which carries out binary quantisation. The comparator output is a 1 if the amplifier output is a positive voltage and a 0 otherwise. This produces 1's and 0's with equal probability at the output of the comparator. The output of the comparator is clocked into a shift register having p shift register stages, each of delay T. The clock rate is 1/T. After p clock cycles the contents of the shift register represents a number in binary which is the random number s having a uniform probability distribution between 0 and $2^p-1$.

One or more of the bits output from the shift register may be permanently set to a 1 to provide a lower limit to the random number of errors s. As an example if the 4th bit (counting from 0) is permanently set to 1 then s has a uniform probability distribution between $2^3=8$ and $2^p-1$.

Similarly the highest level of security is provided if the positions of the errors generated by generate random errors of FIG. 1 is a truly random number generator and not a pseudo random generator. An example of an arrangement which generates truly random positions in the range of 0 to $2^m-1$ corresponding to the codeword length is shown in FIG. 3.

Figure 3:
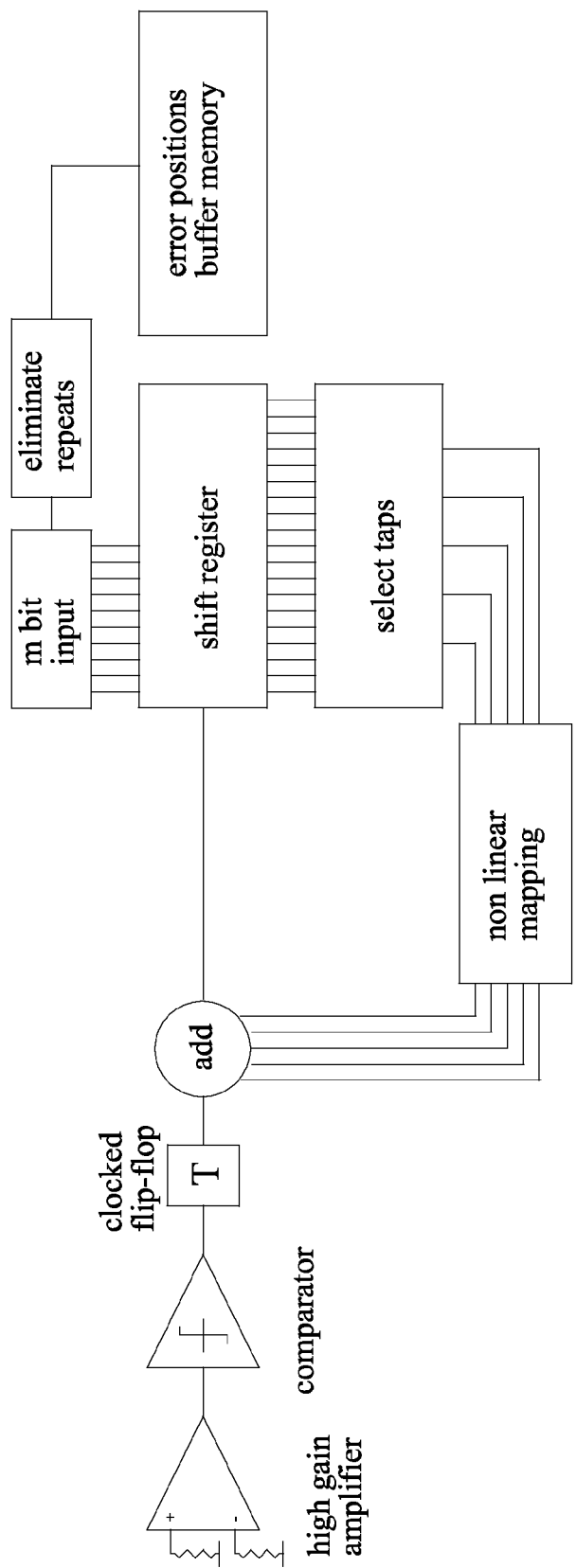
FIG. 3 shows a Random integer generator of error positions according to an embodiment of the invention.

As shown in FIG. 3, the differential amplifier, with high gain, amplifies the thermal noise generated by the resistor terminated inputs. The output of the amplifier is the amplified random noise which is input to a comparator which outputs a 1 if the amplifier output is a positive voltage and a 0 otherwise. This produces 1's and 0's with equal probability at the output of the comparator. The output of the comparator is clocked into a flip-flop clocked at 1/T with the same clock source as the shift register shown in FIG. 3, marked shift register. The output of the flip-flop is a clocked output of truly random 1's and 0's which is input to a non-linear feedback shift register arrangement.

The output of the flip-flop is input to a module 2 adder add which is added to the outputs of a non-linear mapping of u selected outputs of the shift register. Which outputs are selected corresponds to the key which is being used. The parameter u is a design parameter typically equal to 8.

TABLE 1

Example of non-linear mapping for u = 4

0000 => 0011
0001 => 1011

TABLE 1-continued

Example of non-linear mapping for u = 4

0010 => 0111
0011 => 0110
0100 => 1111
0101 => 0001
0110 => 1001
0111 => 1100
1000 => 1010
1001 => 0000
1010 => 1000
1011 => 0010
1100 => 0101
1101 => 1110
1110 => 0100
1111 => 1101

The non-linear mapping non linear mapping shown in FIG. 3 has a pseudorandom one to one correspondence between each of the $2^n$ input states to each of the $2^n$ output states. An example of such a one to one correspondence, for u=4 is given in Table 1. For example, the first entry, 0000, value 0 is mapped to 0011, value 3.

The shift register typically has a relatively large number of stages, 64 is a typical number of stages and a number of tapped outputs, typically 8. The relationship between the input of the shift register $a_{in}$ and the tapped outputs is usually represented by the delay operator D. Defining the tap positions as $w_i$ for i=0 to $i_{max}$, the input to the non-linear mapping non linear mapping shown in FIG. 3, defined as $x_i$ for i=0 to $i_{max}$, is $$x_i = a_{in} D^{w_i} \qquad (1)$$

and the output $y_i$ after the mapping function, depicted as M is $$y_j = M[x_i] = M[a_{in} D^{w_i}] \qquad (2)$$

The input to the shift register is the output of the adder given by the sum of the random input $R_{nd}$, and the summed output of the mapped outputs. Accordingly $$a_{in} = R_{nd} + \sum_{j=0}^{i_{max}} y_j = R_{nd} + \sum_{j=0}^{i_{max}} M[x_i] = R_{nd} + \sum_{j=0}^{i_{max}} M[a_{in} D^{w_i}] \qquad (3)$$

It can be seen that the shift register input $a_{in}$ is a non-linear function of delayed outputs of itself added to the random input $R_{nd}$ and so will be a random binary function.

The positions of the errors is given by the output of the block m bit input shown in FIG. 3, an m bit memory register and defined as $e_{pos}$. Without loss of generality consider that the first m outputs of the shift register are used as the input to m bit input. The output of m bit input is a binary representation of a number given by $$e_{pos} = \sum_{j=0}^{m-1} 2^j \times a_{in} D^j \qquad (4)$$

Since $a_{in}$ is a random binary function $e_{pos}$ will be an integer between 0 and $2^m-1$ randomly distributed with a uniform distribution. As shown in FIG. 3 these randomly generated integers are stored in memory in the block error positions buffer memory after the block eliminate repeats has eliminated any repeated numbers since repeated integers will occur from time to time in any independently distributed random integer generator.

It is apparent that the functions of random generator of the number of errors shown in FIG. 2 and the error positions generator shown in FIG. 3 described above may be realised by different means by a practitioner skilled in the art.

The random bit errors can only be corrected with the knowledge of the particular non-binary Goppa code, the private key, which is used in deriving the codeword generator matrix. In describing additional details of the invention, some background on Goppa codes is necessary: Goppa defined a family of codes [3] where the coordinates of each codeword $\{c_0, c_1, c_2, \ldots c_{2^m-1}\}$ with $\{c_0=x_0, c_1=x_1, c_2=x_2, \ldots c_{2m-1}=x_{2m-1}\}$ satisfy the congruence p(z) modulo g(z)=0 where g(z) is now known as the Goppa polynomial and p(z) is the Lagrange interpolation polynomial.

Goppa codes have coefficients from $GF(2^m)$ and provided g(z) has no roots which are elements of $GF(2^m)$ (which is straightforward to achieve) the Goppa codes have parameters $(2^m, k, 2^m-k+1)$. Goppa codes can be converted into binary codes having parameters $(2^m, 2^m-mt, d_{min})$ where $d_{min} \geq 2t+1$, the Goppa code bound on minimum Hamming distance, providing that g(z) has no roots which are elements of $GF(2^m)$ and has no repeated roots. Most binary Goppa codes have equality for the bound and t is the number of correctible errors.

For a Goppa polynomial of degree r there are r parity check equations defined from the congruence. Denoting g(z) by $$g(z) = g_r z^r + g_{r-1} z^{r-1} + g_{r-2} z^{r-2} + \ldots + g_1 z + g_0 \quad (5)$$

$$\sum_{i=0}^{2^m-1} \frac{c_i}{z - \alpha_i} = 0 \; \text{modulo} \, g(z) \quad (6)$$

Since equation (6) is modulo g(z) then g(z) is equivalent to 0, and we can add g(z) to the numerator. Dividing each term $z-\alpha_i$ into 1+g(z) produces the following $$\frac{g(z)+1}{z-\alpha_i} = q_i(z) + \frac{r_m+1}{z-\alpha_i} \quad (7)$$

Where $r_m$ is the remainder, an element of $GF(2^m)$ after dividing g(z) by $z-\alpha_i$.

As $r_m$ is a scalar, g(z) may simply be pre-multiplied by $1/r_m$ so that the remainder cancels with the other numerator term which is 1.

$$\frac{\frac{g(z)}{r_m}+1}{z-\alpha_i} = \frac{q_i(z)}{r_m} + \frac{\frac{r_m}{r_m}+1}{z-\alpha_i} = \frac{q(z)}{r_m} \quad (8)$$

$$g(z) = (z-\alpha_i) q_i(z) + r_m \quad (9)$$

When $z=\alpha_i$, $r_m = g(\alpha_i)$

Substituting for $r_m$ in equation (8) produces $$\frac{\frac{g(z)}{g(\alpha_i)}+1}{z-\alpha_i} = \frac{q_i(z)}{g(\alpha_i)} \quad (10)$$

Since $g(z)/g(\alpha_i)$ modulo g(z)=0

$$\frac{1}{z-\alpha_i} = \frac{q_i(z)}{g(\alpha_i)} \quad (11)$$

The quotient polynomial $q_i(z)$ is a polynomial of degree r−1 with coefficients which are a function of $\alpha_i$ and the Goppa polynomial coefficients. Denoting $q_i(z)$ as $$q_i(z) = q_{i,0} + q_{i,1} z + q_{i,2} z^2 + q_{i,3} z^3 + \ldots + q_{i,(r-1)} z^{r-1} \quad (12)$$

Since the coefficients of each power of z sum to zero the r parity check equations are given by $$\sum_{i=0}^{2^m-1} \frac{c_i q_{i,j}}{g(\alpha_i)} = 0 \; \text{for} \; j = 0 \; \text{to} \; r-1 \quad (13)$$

If the Goppa polynomial has any roots which are elements of $GF(2^m)$, say then the codeword coordinate $c_j$ has to be permanently set to zero in order to satisfy the parity check equations. Effectively the code length is reduced by the number of roots of g(z) which are elements of $GF(2^m)$. Usually the Goppa polynomial is chosen to have distinct roots, none of which are in $GF(2^m)$.

The security depends upon the number of bit errors added and practical examples of the invention usually use long Goppa codes of length 512 bits, 1024 bits, 2048 bits or longer. However, good results can also be achieved with shorter codes such as 128 bits or 256 bits. For clarity, the invention will be described by way of examples using a binary Goppa code of length 32 bits capable of correcting 4 bit errors. It is important to note that all binary Goppa codes are derived from non-binary Goppa codes which are designed first.

In this example, the non-binary Goppa code consists of 32 symbols from the Galois field $GF(2^5)$ and each symbol takes on 32 possible values with the code capable of correcting 2 errors. There are 28 information symbols and 4 parity check symbols. (It should be noted that when the Goppa code is used with information symbols restricted to 2 values as is the case for a binary Goppa code twice as many errors can be corrected if the Goppa polynomial has no repeated roots [6]). The non-binary Goppa code has parameters of a (32,28,5) code. There are 4 parity check symbols derived from 4 parity check equations corresponding to the parity check matrix and the Goppa polynomial has degree 4. Choosing arbitrarily as the Goppa polynomial, the polynomial $1+z+z^4$ which has roots only in GF(16) and none in GF(32), we determine $q_i(z)$ by dividing by $$q_i(z) = z^3 + \alpha_i z^2 + \alpha_i^2 z + (1+\alpha_i^3) \quad (14)$$

The 4 parity check equations are $$\sum_{i=0}^{31} \frac{c_i}{g(\alpha_i)} = 0 \quad (15)$$

$$\sum_{i=0}^{31} \frac{c_i \alpha_i}{g(\alpha_i)} = 0 \quad (16)$$

$$\sum_{i=0}^{31} \frac{c_i \alpha_i^2}{g(\alpha_i)} = 0 \quad (17)$$

$$\sum_{i=0}^{31} \frac{c_i (1+\alpha_i^3)}{g(\alpha_i)} = 0 \quad (18)$$

Using the $GF(2^5)$ Table, Table 2 to evaluate the different terms for $GF(2^5)$, the parity check $$H_{(32,28,5)} = \begin{bmatrix} 1 & 1 & \alpha^{14} & \alpha^{28} & \alpha^{20} & \alpha^{25} & \ldots & \alpha^{10} \\ 0 & 1 & \alpha^{15} & \alpha^{30} & \alpha^{23} & \alpha^{29} & \ldots & \alpha^{9} \\ 0 & 1 & \alpha^{16} & \alpha^{1} & \alpha^{26} & \alpha^{2} & \ldots & \alpha^{8} \\ 1 & 0 & \alpha^{12} & \alpha^{24} & \alpha^{5} & \alpha^{17} & \ldots & \alpha^{5} \end{bmatrix} \quad (19)$$

To implement the Goppa code as a binary code, the symbols in the parity check matrix are replaced with their m-bit binary column representations of each respective $GF(2^m)$ symbol. For the (32,28,5) Goppa code above, each of the 4 parity symbols in each column of (19) will be represented as a 5 bit symbol from Table 2. The parity check matrix will now have 20 rows for the binary code. The minimum Hamming distance of the binary Goppa code is improved from r+1 to 2r+1.

TABLE 2

| GF(32) non-zero extension field elements defined by $1 + \alpha^2 + \alpha^5 = 0$ | |
|---|---|
| $\alpha^0 =$ | 1 |
| $\alpha^1 =$ | $\alpha$ |
| $\alpha^2 =$ | $\alpha^2$ |
| $\alpha^3 =$ | $\alpha^3$ |
| $\alpha^4 =$ | $\alpha^4$ |
| $\alpha^5 =$ | $1 + \alpha^2$ |
| $\alpha^6 =$ | $\alpha + \alpha^3$ |
| $\alpha^7 =$ | $\alpha^2 + \alpha^4$ |
| $\alpha^8 =$ | $1 + \alpha^2 + \alpha^3$ |
| $\alpha^9 =$ | $\alpha + \alpha^3 + \alpha^4$ |
| $\alpha^{10} =$ | $1 + \alpha^4$ |
| $\alpha^{11} =$ | $1 + \alpha + \alpha^2$ |
| $\alpha^{12} =$ | $\alpha + \alpha^2 + \alpha^3$ |
| $\alpha^{13} =$ | $\alpha^2 + \alpha^3 + \alpha^4$ |
| $\alpha^{14} =$ | $1 + \alpha^2 + \alpha^3 + \alpha^4$ |
| $\alpha^{15} =$ | $1 + \alpha + \alpha^2 + \alpha^3 + \alpha^4$ |
| $\alpha^{16} =$ | $1 + \alpha + \alpha^3 + \alpha^4$ |
| $\alpha^{17} =$ | $1 + \alpha + \alpha^4$ |
| $\alpha^{18} =$ | $1 + \alpha$ |
| $\alpha^{19} =$ | $\alpha + \alpha^2$ |
| $\alpha^{20} =$ | $\alpha^2 + \alpha^3$ |
| $\alpha^{21} =$ | $\alpha^3 + \alpha^4$ |
| $\alpha^{22} =$ | $1 + \alpha^2 + \alpha^4$ |
| $\alpha^{23} =$ | $1 + \alpha + \alpha^2 + \alpha^3$ |
| $\alpha^{24} =$ | $\alpha + \alpha^2 + \alpha^3 + \alpha^4$ |
| $\alpha^{25} =$ | $1 + \alpha^3 + \alpha^4$ |
| $\alpha^{26} =$ | $1 + \alpha + \alpha^2 + \alpha^4$ |
| $\alpha^{27} =$ | $1 + \alpha + \alpha^3$ |

TABLE 2-continued

| GF(32) non-zero extension field elements defined by $1 + \alpha^2 + \alpha^5 = 0$ | |
|---|---|
| $\alpha^{28} =$ | $\alpha + \alpha^2 + \alpha^4$ |
| $\alpha^{29} =$ | $1 + \alpha^3$ |
| $\alpha^{30} =$ | $\alpha + \alpha^4$ |

Correspondingly the binary Goppa code becomes a (32,12,9) code with parity check matrix $$H_{(32,12,9)} = \begin{bmatrix} 1 & 1 & 1 & 0 & 0 & 1 & \ldots & 1 \\ 0 & 0 & 0 & 1 & 0 & 0 & \ldots & 0 \\ 0 & 0 & 1 & 1 & 1 & 0 & \ldots & 0 \\ 0 & 0 & 1 & 0 & 1 & 1 & \ldots & 0 \\ 0 & 0 & 1 & 1 & 0 & 1 & \ldots & 1 \\ 0 & 1 & 1 & 0 & 1 & 1 & \ldots & 0 \\ 0 & 0 & 1 & 1 & 1 & 0 & \ldots & 1 \\ 0 & 0 & 1 & 0 & 1 & 0 & \ldots & 0 \\ 0 & 0 & 1 & 0 & 1 & 1 & \ldots & 1 \\ 0 & 0 & 1 & 1 & 0 & 0 & \ldots & 1 \\ 0 & 1 & 1 & 1 & 1 & 0 & \ldots & 1 \\ 0 & 0 & 1 & 0 & 1 & 0 & \ldots & 0 \\ 0 & 0 & 0 & 0 & 1 & 1 & \ldots & 1 \\ 0 & 0 & 1 & 0 & 0 & 0 & \ldots & 1 \\ 0 & 0 & 1 & 0 & 1 & 0 & \ldots & 0 \\ 1 & 0 & 0 & 0 & 1 & 1 & \ldots & 1 \\ 0 & 0 & 1 & 1 & 0 & 1 & \ldots & 0 \\ 0 & 0 & 1 & 1 & 1 & 0 & \ldots & 1 \\ 0 & 0 & 1 & 1 & 0 & 0 & \ldots & 0 \\ 0 & 0 & 0 & 1 & 0 & 1 & \ldots & 0 \end{bmatrix} \quad (20)$$

The next step is to turn the parity check matrix into reduced echelon form by using elementary matrix row and column operations so that there are 20 rows representing independent parity check equations for each parity bit as described in standard textbooks on error correcting codes [6, 7]. From the reduced echelon parity check matrix the generator matrix can be obtained straightforwardly as it is the transpose of the reduced echelon parity check matrix. The resulting generator matrix is $$G_{(32,12,9)} = \begin{bmatrix} 1 & 0 & 0 & 0 & 0 & 0 & 0 & 0 & 0 & 0 & 0 & 0 & 1 & 1 & 0 & 0 & 0 & 1 & 1 & 1 & 1 & 0 & 1 & 0 & 0 & 1 & 1 & 1 & 0 & 1 & 1 & 0 \\ 0 & 1 & 0 & 0 & 0 & 0 & 0 & 0 & 0 & 0 & 0 & 0 & 1 & 1 & 0 & 1 & 0 & 1 & 1 & 0 & 0 & 0 & 0 & 1 & 1 & 0 & 1 & 0 & 1 & 1 & 0 & 0 \\ 0 & 0 & 1 & 0 & 0 & 0 & 0 & 0 & 0 & 0 & 0 & 0 & 0 & 1 & 1 & 0 & 0 & 1 & 1 & 0 & 0 & 0 & 0 & 1 & 1 & 0 & 1 & 0 & 0 & 1 & 0 \\ 0 & 0 & 0 & 1 & 0 & 0 & 0 & 0 & 0 & 0 & 0 & 0 & 1 & 1 & 1 & 1 & 1 & 0 & 1 & 0 & 1 & 0 & 1 & 1 & 0 & 0 & 0 & 1 & 0 & 1 & 0 \\ 0 & 0 & 0 & 0 & 1 & 0 & 0 & 0 & 0 & 0 & 0 & 0 & 1 & 1 & 0 & 0 & 0 & 0 & 1 & 1 & 0 & 1 & 0 & 0 & 1 & 1 & 1 & 0 & 0 & 0 & 0 & 1 \\ 0 & 0 & 0 & 0 & 0 & 1 & 0 & 0 & 0 & 0 & 0 & 0 & 1 & 1 & 1 & 1 & 1 & 0 & 0 & 1 & 1 & 0 & 0 & 0 & 1 & 0 & 1 & 0 & 1 & 0 & 0 & 1 \\ 0 & 0 & 0 & 0 & 0 & 0 & 1 & 0 & 0 & 0 & 0 & 0 & 0 & 0 & 0 & 1 & 0 & 1 & 1 & 1 & 1 & 1 & 0 & 0 & 0 & 1 & 1 & 1 & 0 & 0 \\ 0 & 0 & 0 & 0 & 0 & 0 & 0 & 1 & 0 & 0 & 0 & 0 & 0 & 1 & 1 & 1 & 0 & 0 & 1 & 1 & 0 & 0 & 1 & 1 & 1 & 0 & 0 & 0 & 1 & 0 & 0 \\ 0 & 0 & 0 & 0 & 0 & 0 & 0 & 0 & 1 & 0 & 0 & 0 & 1 & 1 & 1 & 1 & 0 & 1 & 1 & 1 & 1 & 1 & 1 & 1 & 0 & 1 & 1 & 1 & 1 & 1 & 0 & 1 \\ 0 & 0 & 0 & 0 & 0 & 0 & 0 & 0 & 0 & 1 & 0 & 0 & 1 & 1 & 1 & 0 & 1 & 1 & 0 & 1 & 1 & 1 & 0 & 0 & 1 & 0 & 0 & 1 & 0 & 1 & 1 \\ 0 & 0 & 0 & 0 & 0 & 0 & 0 & 0 & 0 & 0 & 1 & 0 & 0 & 0 & 1 & 1 & 1 & 0 & 0 & 1 & 1 & 1 & 0 & 1 & 1 & 0 & 0 & 1 & 1 & 0 & 0 \\ 0 & 0 & 0 & 0 & 0 & 0 & 0 & 0 & 0 & 0 & 0 & 1 & 1 & 1 & 1 & 0 & 1 & 1 & 0 & 0 & 1 & 0 & 0 & 1 & 1 & 0 & 1 & 1 & 0 & 1 & 1 & 1 \end{bmatrix} \quad (21)$$

It will be noticed that the generator matrix is in reduced echelon form and has 12 rows, one row for each information bit. Each row is the codeword resulting from that information bit equal to a 1, all other information bits equal to 0.

The next step is to scramble the information bits by multiplying by a k×k non-singular matrix, that is, one that is invertible. As a simple example, the following 12×12 matrix is invertible.

$$NS_{12\times12} = \begin{bmatrix} 0 & 1 & 1 & 1 & 0 & 1 & 0 & 0 & 1 & 1 & 1 & 0 \\ 0 & 0 & 1 & 1 & 1 & 0 & 1 & 0 & 0 & 1 & 1 & 1 \\ 1 & 0 & 0 & 1 & 1 & 1 & 0 & 1 & 0 & 0 & 1 & 1 \\ 1 & 1 & 0 & 0 & 1 & 1 & 1 & 0 & 1 & 0 & 0 & 1 \\ 1 & 1 & 1 & 0 & 0 & 1 & 1 & 1 & 0 & 1 & 0 & 0 \\ 0 & 1 & 1 & 1 & 0 & 0 & 1 & 1 & 1 & 0 & 1 & 0 \\ 0 & 0 & 1 & 1 & 1 & 0 & 0 & 1 & 1 & 1 & 0 & 1 \\ 1 & 0 & 0 & 1 & 1 & 1 & 0 & 0 & 1 & 1 & 1 & 0 \\ 0 & 1 & 0 & 0 & 1 & 1 & 1 & 0 & 0 & 1 & 1 & 1 \\ 1 & 0 & 1 & 0 & 0 & 1 & 1 & 1 & 0 & 0 & 1 & 1 \\ 1 & 1 & 0 & 1 & 0 & 0 & 1 & 1 & 1 & 0 & 0 & 1 \\ 1 & 1 & 1 & 0 & 1 & 0 & 0 & 1 & 1 & 1 & 0 & 0 \end{bmatrix} \quad (22)$$

It is invertible using this matrix:

$$NS^{-1}_{12\times12} = \begin{bmatrix} 1 & 1 & 0 & 1 & 0 & 0 & 0 & 0 & 0 & 0 & 0 & 0 \\ 0 & 1 & 1 & 0 & 1 & 0 & 0 & 0 & 0 & 0 & 0 & 0 \\ 0 & 0 & 1 & 1 & 0 & 1 & 0 & 0 & 0 & 0 & 0 & 0 \\ 0 & 0 & 0 & 1 & 1 & 0 & 1 & 0 & 0 & 0 & 0 & 0 \\ 0 & 0 & 0 & 0 & 1 & 1 & 0 & 1 & 0 & 0 & 0 & 0 \\ 0 & 0 & 0 & 0 & 0 & 1 & 1 & 0 & 1 & 0 & 0 & 0 \\ 0 & 0 & 0 & 0 & 0 & 0 & 1 & 1 & 0 & 1 & 0 & 0 \\ 0 & 0 & 0 & 0 & 0 & 0 & 0 & 1 & 1 & 0 & 1 & 0 \\ 0 & 0 & 0 & 0 & 0 & 0 & 0 & 0 & 1 & 1 & 0 & 1 \\ 1 & 0 & 0 & 0 & 0 & 0 & 0 & 0 & 0 & 1 & 1 & 0 \\ 0 & 1 & 0 & 0 & 0 & 0 & 0 & 0 & 0 & 0 & 1 & 1 \\ 1 & 0 & 1 & 0 & 0 & 0 & 0 & 0 & 0 & 0 & 0 & 1 \end{bmatrix} \quad (23)$$

The next step is to scramble the generator matrix with the non-singular matrix to produce the scrambled generator matrix given below. The code produced with this generator matrix has the same codewords as the generator matrix given by matrix (21) and can correct the same number of errors but there is a different mapping to codewords for a given k bit input information bit vector.

$$SG_{(32,12,9)} = \begin{bmatrix} 0 & 1 & 1 & 1 & 0 & 1 & 0 & 0 & 1 & 1 & 1 & 0 & 1 & 1 & 1 & 0 & 0 & 1 & 0 & 1 & 1 & 1 & 1 & 0 & 0 & 0 & 0 & 0 & 0 & 1 & 1 & 1 \\ 0 & 0 & 1 & 1 & 1 & 0 & 1 & 0 & 0 & 1 & 1 & 1 & 0 & 0 & 0 & 1 & 1 & 0 & 0 & 1 & 1 & 0 & 1 & 0 & 0 & 0 & 1 & 1 & 0 & 1 & 0 & 1 \\ 1 & 0 & 0 & 1 & 1 & 1 & 0 & 1 & 0 & 0 & 1 & 1 & 1 & 1 & 0 & 0 & 1 & 0 & 0 & 1 & 1 & 1 & 0 & 1 & 0 & 0 & 0 & 0 & 1 & 0 & 1 & 1 \\ 1 & 1 & 0 & 0 & 1 & 1 & 1 & 0 & 1 & 0 & 0 & 1 & 0 & 0 & 1 & 1 & 1 & 0 & 1 & 1 & 1 & 1 & 0 & 0 & 1 & 0 & 0 & 0 & 1 & 0 & 0 & 0 \\ 1 & 1 & 1 & 0 & 0 & 1 & 1 & 1 & 0 & 1 & 0 & 0 & 0 & 0 & 0 & 0 & 0 & 1 & 1 & 0 & 0 & 1 & 1 & 0 & 1 & 0 & 0 & 1 & 0 & 0 & 1 & 0 \\ 0 & 1 & 1 & 1 & 0 & 0 & 1 & 1 & 1 & 0 & 1 & 0 & 1 & 1 & 0 & 0 & 0 & 0 & 1 & 1 & 1 & 1 & 1 & 0 & 0 & 0 & 1 & 1 & 1 & 1 & 0 & 1 \\ 0 & 0 & 1 & 1 & 1 & 0 & 0 & 1 & 1 & 1 & 0 & 1 & 1 & 1 & 0 & 0 & 0 & 0 & 0 & 0 & 1 & 1 & 0 & 1 & 0 & 1 & 0 & 1 & 1 & 1 & 0 & 0 \\ 1 & 0 & 0 & 1 & 1 & 1 & 0 & 0 & 1 & 1 & 1 & 0 & 0 & 0 & 0 & 0 & 1 & 1 & 0 & 1 & 1 & 0 & 0 & 0 & 1 & 0 & 0 & 1 & 1 & 1 & 0 & 0 \\ 0 & 1 & 0 & 0 & 1 & 1 & 1 & 0 & 0 & 1 & 1 & 1 & 1 & 1 & 1 & 1 & 0 & 1 & 0 & 1 & 0 & 1 & 1 & 1 & 1 & 0 & 0 & 1 & 0 & 0 & 0 & 0 \\ 1 & 0 & 1 & 0 & 0 & 1 & 1 & 1 & 0 & 0 & 1 & 1 & 1 & 1 & 0 & 0 & 1 & 1 & 0 & 1 & 1 & 1 & 1 & 0 & 0 & 0 & 0 & 0 & 1 & 1 & 1 & 0 \\ 1 & 1 & 0 & 1 & 0 & 0 & 1 & 1 & 1 & 0 & 0 & 1 & 1 & 1 & 0 & 0 & 0 & 1 & 0 & 1 & 1 & 1 & 1 & 0 & 0 & 1 & 0 & 0 & 0 & 0 & 1 & 0 \\ 1 & 1 & 1 & 0 & 1 & 0 & 0 & 1 & 1 & 1 & 0 & 0 & 1 & 1 & 0 & 0 & 0 & 0 & 0 & 1 & 0 & 1 & 0 & 1 & 0 & 1 & 1 & 1 & 0 & 1 & 1 \end{bmatrix} \quad (24)$$

It may be seen that, for example, the first row of this matrix is the modulo 2 sum of rows 1, 2, 3, 5, 8, 9 and 10 of matrix (21) in accordance with the non-singular matrix (22).

The next step in producing the public key generator matrix for producing the codewords from the message vectors is to permute the column of the matrix above. Any permutation may be randomly chosen. For example, we may use the following permutation defined by the input and output bit position sequences:

27 15 4 2 19 21 17 14 7 16 20 1 29 8 11 12 25 5 30 24
6 18 13 3 0 26 23 28 22 31 9 10 0 1 2 3 4 5 6 7 8
9 10 11 12 13 14 15 16 17 18 19 20 21 22 23 24
25 26 27 28 29 30 31                 (25)

It should be noted that the same permutation may be represented by a corresponding permutation matrix and a permutation of an input sequence of bits can be achieved by a matrix multiplication with a permutation matrix.

Using the permutation defined by the input and output sequences above, it can be seen that, for example, column 0 of matrix (24) becomes column 24 of the permuted generator matrix and column 31 of matrix (24) becomes column 29 of the permuted generator matrix. The resulting, permuted generator matrix is given below.

$$PSG_{(32,12,9)} = \begin{bmatrix} 0&0&0&1&1&1&1&0&0&1&1&1&1&0&1&0&1&1&0&0&0&1&1&0&0&0&0&1&1&1&1 \\ 1&1&1&1&1&0&0&0&0&1&1&0&1&0&1&0&0&0&0&0&1&0&0&1&0&1&0&0&1&1&1&1 \\ 0&0&1&0&1&1&0&0&1&1&1&0&0&0&1&1&0&1&1&0&0&0&1&1&1&0&1&1&0&1&0&1 \\ 0&1&1&0&1&1&0&1&0&1&1&1&1&1&1&0&1&1&0&0&1&1&0&0&1&0&0&0&1&0&0&0 \\ 1&0&0&1&0&1&1&0&1&0&0&1&0&0&0&0&1&1&1&1&1&0&0&1&0&0&0&1&0&1&0 \\ 1&0&0&1&1&1&0&0&1&0&1&1&1&1&0&1&0&0&0&0&1&1&1&1&0&1&0&1&1&1&0&1 \\ 1&0&1&1&0&1&0&0&1&0&1&0&1&1&1&1&0&0&0&0&0&1&1&0&0&1&1&0&0&1&0 \\ 0&0&1&0&0&1&1&0&0&0&1&0&1&1&0&0&1&1&1&0&0&1&0&1&1&0&0&1&0&0&1&1 \\ 0&1&1&0&0&0&0&1&0&1&1&1&0&0&1&1&1&1&0&1&1&1&1&0&0&0&1&1&1&0&1&1 \\ 0&0&0&1&1&1&1&0&1&1&1&0&1&0&1&1&0&1&1&0&1&0&1&0&1&0&0&1&1&0&0&1 \\ 0&0&0&0&1&1&1&0&1&0&1&1&0&1&1&1&1&0&1&0&1&0&1&1&1&0&0&0&1&0&0&0 \\ 1&0&1&1&0&0&0&0&1&0&1&1&0&1&0&1&0&0&1&1&0&0&1&0&1&1&0&1&1&1&1&0 \end{bmatrix} \quad (26)$$

In the original McEliece public key system [2] this k×n (12×32) matrix, $PSG_{(32,12,9)}$, is the public key but in the invention a smaller k×(n−k), (12×20) matrix is the public key. In the invention, rows of matrix $PSG_{(32,12,9)}$ are added together using modulo 2 arithmetic so as to produce a matrix with k independent columns. This matrix is a permuted reduced echelon matrix which may be straightforwardly derived by using the Gauss-Jordan variable elimination procedure. There are a large number of possible solutions which may be derived and candidate column positions may be selected either in consecutive order to determine a solution or optionally, selected in random order to arrive at a random solution.

Consider as an example the first option of selecting candidate column positions in consecutive order. For the matrix above, the following permuted reduced echelon generator matrix is produced:

$$PSGR_{(32,12,9)} = \begin{bmatrix} 1&0&0&0&0&0&0&0&0&0&0&0&1&0&0&1&1&0&1&0&1&0&1&0&0&0&1&1&1&1&1 \\ 0&1&0&0&0&0&0&0&0&1&0&0&0&0&0&1&0&0&1&0&0&0&1&0&0&1&0&1&1&1&0 \\ 0&0&1&0&0&0&0&0&0&0&0&0&1&0&1&0&0&1&0&1&1&1&1&0&0&1&1&0&0&0&0 \\ 0&0&0&1&0&0&0&0&0&1&1&0&1&0&0&1&0&1&0&0&0&0&1&0&1&0&0&0&0&1&0 \\ 0&0&0&0&1&0&0&0&0&0&1&0&1&0&0&1&1&1&1&0&1&0&0&1&0&0&0&1&0&0&1 \\ 0&0&0&0&0&1&0&0&0&0&1&0&0&0&0&0&1&0&0&1&1&0&1&1&1&1&1&1&1&0&1 \\ 0&0&0&0&0&0&1&0&0&0&1&1&0&0&0&0&0&0&1&0&1&1&0&0&1&0&0&1&1&0&0&1 \\ 0&0&0&0&0&0&0&1&0&0&1&1&0&1&0&0&1&1&1&1&1&1&0&0&0&0&1&1&0&0&1&1&1 \\ 0&0&0&0&0&0&0&0&1&0&0&0&0&0&0&0&1&1&0&1&0&0&1&1&0&1&1&0&0&1&1 \\ 0&0&0&0&0&0&0&0&0&1&1&0&0&0&0&1&1&1&0&0&1&0&1&1&1&0&0&1&0&1&0&0 \\ 0&0&0&0&0&0&0&0&0&0&0&1&0&0&1&1&0&1&0&1&0&1&1&1&1&0&0&0&1&1&1 \\ 0&0&0&0&0&0&0&0&0&0&0&0&1&1&0&1&0&1&0&1&1&1&1&1&0&1&0&1&1&0 \end{bmatrix} \quad (27)$$

The permutation defined by the following input and output bit position sequences is used to rearrange the columns of the permuted, reduced echelon generator matrix.

0 1 2 3 4 5 6 7 8 9 12 14 10 11 13 15 16 17 18 19 20
21 22 23 24 25 26 27 28 29 30 31 0 1 2 3 4 5 6 7
8 9 10 11 12 13 14 15 16 17 18 19 20 21 22 23
24 25 26 27 28 29 30 31 (28)

This permutation produces a classical reduced echelon generator matrix [6], denoted as $Q_{(32,12,9)}$ $$Q_{(32,12,9)} = \begin{bmatrix} 1&0&0&0&0&0&0&0&0&0&0&0&0&1&0&1&1&0&1&0&1&0&1&0&0&0&1&1&1&1&1 \\ 0&1&0&0&0&0&0&0&0&0&0&0&1&0&0&0&1&0&0&1&0&0&0&1&0&0&1&0&1&1&1&0 \\ 0&0&1&0&0&0&0&0&0&0&0&0&0&1&1&0&0&1&0&1&1&1&1&0&0&1&1&0&0&0&0 \\ 0&0&0&1&0&0&0&0&0&0&0&0&1&1&1&0&1&0&1&0&0&0&0&1&0&1&0&0&0&0&1&0 \\ 0&0&0&0&1&0&0&0&0&0&0&0&0&1&1&0&1&1&1&1&0&1&0&0&1&0&0&0&1&0&0&1 \\ 0&0&0&0&0&1&0&0&0&0&0&0&1&0&0&0&1&0&0&1&1&0&1&1&1&1&1&1&1&1&0&1 \\ 0&0&0&0&0&0&1&0&0&0&0&1&1&0&0&0&0&1&0&1&1&0&0&1&0&0&1&1&0&0&1 \\ 0&0&0&0&0&0&0&1&0&0&0&0&1&1&1&0&1&1&1&1&1&1&0&0&0&1&1&0&0&1&1&1 \\ 0&0&0&0&0&0&0&0&1&0&0&0&0&0&0&0&1&1&0&1&0&0&1&1&0&1&1&0&0&1&1 \\ 0&0&0&0&0&0&0&0&0&1&0&0&1&0&0&1&1&1&0&0&1&0&1&1&1&0&0&1&0&1&0&0 \\ 0&0&0&0&0&0&0&0&0&0&1&0&0&0&0&1&1&0&1&0&1&0&1&1&1&1&0&0&0&1&1&1 \\ 0&0&0&0&0&0&0&0&0&0&0&1&0&0&0&1&0&1&0&1&0&1&1&1&1&1&0&1&0&1&1&0 \end{bmatrix}$$ (29)

Codewords generated by this matrix are from a systematic code [6] with the first 12 bits being information bits and the last 20 bits being parity bits. Correspondingly the matrix above, $Q_{(32,12,9)}$ consists of an identity matrix followed by a matrix denoted as $QT_{(32,12,9)}$ which defines the parity bits part of the generator matrix. The transpose of this matrix is the parity check matrix of the code [6]. In one embodiment of the invention shown in FIG. 1, the public key consists of the parity check matrix, less the identity sub-matrix, and a sequence of n numbers representing a permutation of the codeword bits after encoding. In the special case that this permutation is the inverse permutation of that used to produce the reduced echelon generator matrix then the resulting permuted codewords will be identical to codewords produced by $PSG_{(32,12,9)}$ the public key of the original McEliece public key system [2]. The permutation is defined by the following input and output bit position sequences:

0 1 2 3 4 5 6 7 8 9 12 14 10 11 13 15 16 17 18 19 20
21 22 23 24 25 26 27 28 29 30 31 0 1 2 3 4 5 6 7
8 9 10 11 12 13 14 15 16 17 18 19 20 21 22 23
24 25 26 27 28 29 30 31 (30)

As the output bit position sequence is just a sequence of bits in natural order, the permutation may be defined only by the input bit position sequence.

In this embodiment of the invention the public key consists of an n position permutation sequence, in this example the sequence chosen is 0 1 2 3 4 5 6 7 8 9 12 14 10 11 13 15 16 17 18 19 20
21 22 23 24 25 26 27 28 29 30 31 (31)

and the k×(n−k) matrix, $QT_{(32,12,9)}$ which in this example is the 12×20 matrix $$QT_{(32,12,9)} = \begin{bmatrix} 0&0&1&0&1&1&0&1&0&1&0&1&0&0&0&1&1&1&1&1 \\ 1&0&0&0&1&0&0&1&0&0&0&1&0&0&1&0&1&1&1&0 \\ 0&0&1&1&0&0&1&0&1&1&1&1&0&0&1&1&0&0&0&0 \\ 1&1&1&0&1&0&1&0&0&0&0&1&0&1&0&0&0&0&1&0 \\ 0&1&1&0&1&1&1&1&0&1&0&0&1&0&0&0&1&0&0&1 \\ 0&1&0&0&0&1&0&0&1&1&0&1&1&1&1&1&1&1&0&1 \\ 1&1&0&0&0&0&1&0&1&1&0&0&1&0&0&1&1&0&0&1 \\ 1&1&1&0&1&1&1&1&1&0&0&0&1&1&0&0&1&1&1 \\ 0&0&0&0&1&1&0&1&0&0&1&1&0&1&1&0&0&1&1 \\ 1&0&0&1&1&1&0&0&1&0&1&1&1&0&0&1&0&1&0&0 \\ 0&0&0&1&1&0&1&0&1&0&1&1&1&1&0&0&0&1&1&1 \\ 0&0&0&1&0&1&0&1&0&1&1&1&1&1&0&1&0&1&1&0 \end{bmatrix}$$ (32)

For most cases the public key of the invention is much smaller than the public key of the original McEliece public key system.

The message is split into message vectors of length 12 bits adding padding bits as necessary so that there is an integral number of message vectors. Each message vector, after scrambling, is encoded as a systematic codeword using $QT_{(32,12,9)}$ part of the public key. Each systematic codeword that is obtained is permuted using the permutation (31), the other part of the public key. The resulting codewords are identical to codewords generated using tire generator matrix $PSG_{(32,12,9)}$ (26), the corresponding public key of the original McEliece public key system, but generated by different messages.

It should be noted that it is not necessary to use the exact permutation sequence that produces codewords identical to that produced by the original McEliece public key system for the same Goppa code and input parameters. As every permutation sequence has an inverse permutation sequence, any arbitrary permutation sequence, randomly generated or otherwise, may be used in this embodiment of the invention for the permutation sequence part of the public key. The permutation sequence that is the inverse of this arbitrary permutation sequence is absorbed into the permutation sequence used in decryption and forms part of the private key. The security of the system is enhanced by allowing arbitrary permutation sequences to be used. Other embodiments of the invention do not need, or have, a permutation sequence as part of the public key.

The purpose of scrambling each message vector using the fixed scrambler shown in FIG. 1 is to provide a one to one mapping between the $2^k$ possible message vectors and the $2^k$ scrambled message vectors such that the reverse mapping, which is provided by the descrambler, used in decryption, produces error multiplication if there are any errors present. For many messages some information can be gained even if the message contains errors. The scrambler and corresponding descrambler prevents information being gained this way from the cryptogram itself or by means of some error guessing strategy for decryption by an interceptor. The descrambler is designed to have the property that it produces descrambled message vectors having a large Hamming distance between vectors for input scrambled message vectors which differ in a small number of bit positions.

Figure 4:
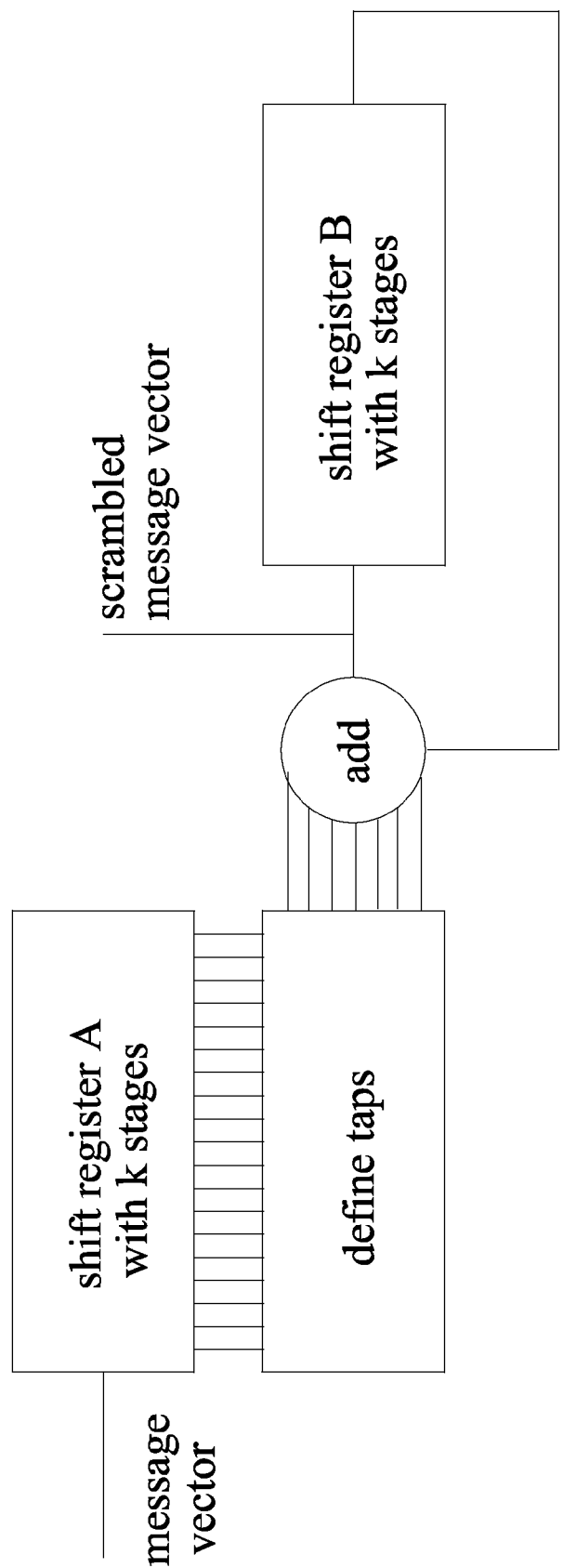
FIG. 4 shows a Scrambler arrangement according to an embodiment of the invention.
Figure 5:
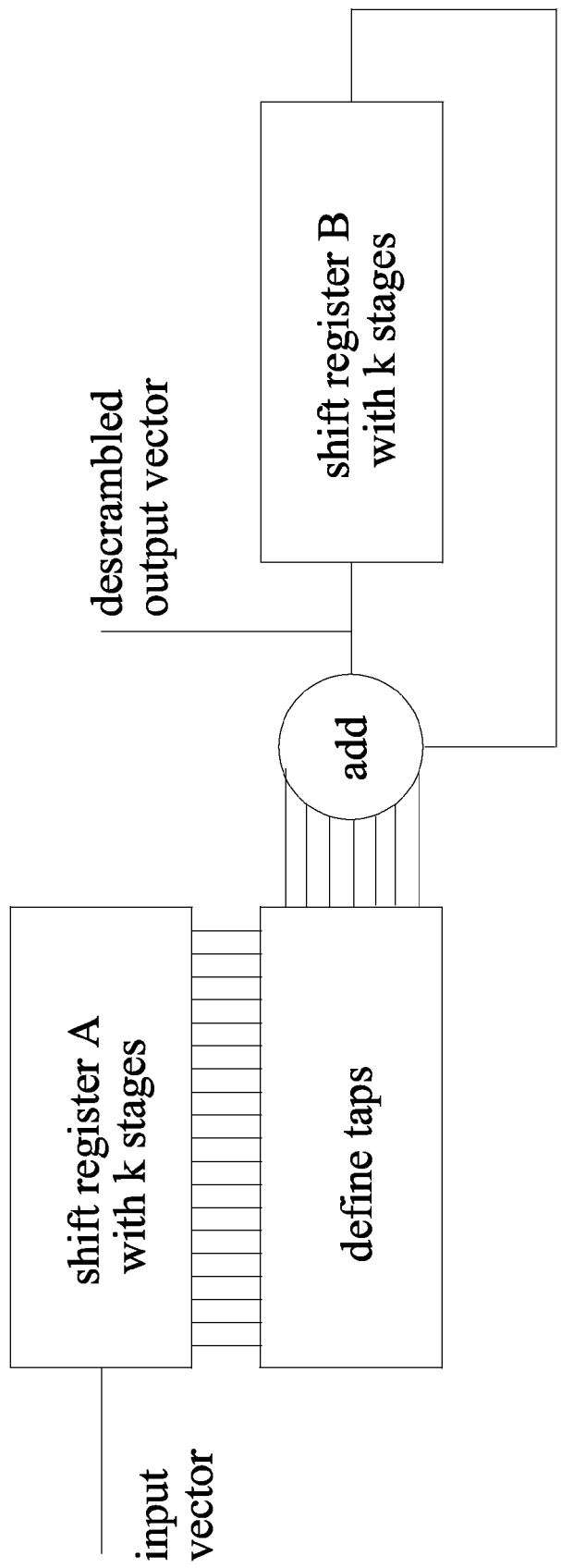
FIG. 5 shows a Descrambler arrangement according to an embodiment of the invention.

There are a number of different techniques of realising such a scrambler and descrambler. One method is to use symmetric key encryption such as the Advanced Encryption Standard (AES) [8] with a fixed key. Another means is provided by the scrambler arrangement shown in FIG. 4. The same arrangement may be used for descrambling but with different taps and is shown in FIG. 5. Denoting each k bit message vector as a polynomial m(x) of degree k−1:

$$m(x) = m_0 + m_1 x + m_2 x^2 + m_3 x^3 \ldots + m_{k-1} x^{k-1} \quad (33)$$

and denoting the tap positions determined by define taps of FIG. 4 by $\mu(x)$ where $$\mu(x) = \mu_0 + \mu_1 x + \mu_2 x^2 + \mu_3 x^3 \ldots + \mu_{k-1} x^{k-1} \quad (34)$$

where the coefficients $\mu_0$ through to $\mu_{k-1}$ have binary values of 1 or 0.

The output of the scrambler, denoted by the polynomial, scram(x), is the scrambled message vector given by the polynomial multiplication $$\text{scram}(x) = m(x) \cdot \mu(x) \text{ modulo } (1 + x^k) \quad (35)$$

The scrambled message vector is produced by the arrangement shown in FIG. 4 after the blocks shift register A with k stages and shift register B with k stages have been clocked 2k times and is present at the input of the block shift register B with k stages whose last stage output is connected to the adder, adder input. The input of shift register B with k stages corresponds to the scrambled message vector for the next additional k clock cycles, with these bits defining the binary coefficients of scram(x). The descrambler arrangement is shown in FIG. 5 and is an identical circuit to that of the scrambler but with different tap settings.

The descrambler is used in decryption.

For k=12, an example of a good scrambler polynomial, $\mu(x)$ is $$\mu(x) = 1 + x + x^4 + x^5 + x^8 + x^9 + x^{11} \quad (36)$$

For brevity, the binary coefficients may be represented as a binary vector. In this example $\mu(x)$ is represented as {1 1 0 0 1 1 0 0 1 1 0 1}. This is a good scrambler polynomial because it has a relatively large number of taps (7 taps) and its inverse, the descrambler polynomial also has a relatively large number of taps (7 taps). The corresponding descrambler polynomial, $\theta(x)$ is $$\theta(x) = 1 + x + x^3 + x^4 + x^8 + x^{11} \quad (37)$$

which may be represented by the binary vector {1 1 0 1 1 0 0 1 1 0 0 1}. It is straightforward to $$\mu(x) \times \theta(x) = 1 + x^2 + x^3 + x^4 + x^5 + x^6 + x^8 + x^{10} + \quad (38)$$
$$x^{14} + x^{15} + x^{16} + x^{17} + x^{18} + x^{20} + x^{22}$$
$$= 1 \text{ modulo}(1 + z^k)$$

and so $$\text{scram}(x) \times \theta(x) = m(x) \text{ modulo } (1 + x^k) \quad (39)$$

As a simple example of a message, consider that the message consists of a single message vector with the information bit pattern {0,1,0,1,0,0,0,0,0.0,0,1} and so:

$$m(x) = x + x^3 + x^{11} \quad (40)$$

This is input to the scrambling arrangement shown in FIG. 4. The scrambled message output is scram(x)=m(x)×$\mu(x)$ given by $$\text{scram}(x) = (1 + x + x^4 + x^5 + x^8 + x^9 + x^{11}) \cdot \quad (41)$$
$$(x + x^3 + x^5 + x^{11})$$
$$= x + x^2 + x^5 + x^6 + x^9 + x^{10} + x^{12} +$$
$$x^3 + x^4 + x^7 + x^8 + x^{11} + x^{12} + x^{14} +$$
$$x^{11} + x^{12} + x^{15} + x^{16} + x^{19} + x^{20} + x^{22}$$
$$\text{modulo}(1 + x^{12})$$
$$= 1 + x + x^5 + x^6 + x^9$$

and the scrambling arrangement shown in FIG. 4 produces the scrambled message comprising bit pattern {1,1,0,0,0,1,1, 0,0,1,0,0}.

Referring to FIG. 1, the next stage is use the parity check matrix part of the public key to calculate the parity bits from the information bits. Starting with an all 0's vector, where the information bit pattern is a 1, the corresponding row from $QT_{(32,12,9)}$ (32) with the same position is added modulo 2 to the result so far to produce the parity bits which, with the information bits, will form the digital cryptogram plus added random errors after permuting the order of the bits. In this example, this codeword is generated from adding modulo 2, rows 1, 2, 6, 7 and 10 of $QT_{(32,12,9)}$ to produce:

```
  0 0 1 0 1 1 0 1 0 1 0 1 0 0 0 1 1 1 1 1   (42)
  + + + + + + + + + + + + + + + + + + + +
  1 0 0 0 1 0 0 1 0 0 0 1 0 0 1 0 1 1 1 0
  + + + + + + + + + + + + + + + + + + + +
  0 1 0 0 0 1 0 0 1 1 0 1 1 1 1 1 1 1 0 1
  + + + + + + + + + + + + + + + + + + + +
  1 1 0 0 0 0 1 0 1 1 0 0 1 0 0 1 1 0 0 1
  + + + + + + + + + + + + + + + + + + + +
  1 0 0 1 1 1 0 0 1 0 1 1 1 0 0 1 0 1 0 0
  = = = = = = = = = = = = = = = = = = = =
  1 0 1 1 1 1 1 0 1 1 1 0 1 1 0 0 0 0 0 1
```

The resulting systematic code, codeword is
{1 1 0 0 0 1 1 0 0 1 0 0 1 0 1 1 1 1 1 0 1 1 1 0 1 1 0 0 0 0 0 1}.

The last step in constructing the final codeword which will be used to construct the cryptogram is to apply an arbitrary permutation sequence which is stored as part of the public key. Referring to FIG. 1, the operation assemble n bit codewords from n−k parity bits and k message bits simply takes each codeword encoded as a systematic codeword and applies the permutation sequence stored as part of the public key.

In this example, the permutation sequence that is used is not chosen arbitrarily but is the permutation sequence that will produce the same codewords as the original McEliece public key system for the same Goppa code and input parameters. The permutation sequence is $$0\ 1\ 2\ 3\ 4\ 5\ 6\ 7\ 8\ 9\ 12\ 14\ 10\ 11\ 13\ 15\ 16\ 17\ 18\ 19\ 20$$
$$21\ 22\ 23\ 24\ 25\ 26\ 27\ 28\ 29\ 30\ 31 \qquad (43)$$

with the meaning that the 10th bit should move to the 12th position, the 11th bit should move to the 14th position, the 12th bit should move to the 10th position, the 13th bit should move to the 11th position, the 14th bit should move to the 13th position and all other bits remain in their same positions. Accordingly the permuted codeword becomes
{1 1 0 0 0 1 1 0 0 1 1 0 0 1 0 1 1 1 1 0 1 1 1 0 1 1 0 0 0 0 0 1}
and this will be output to the adder, add of FIG. 1.

The Goppa code used in this example can correct up to 4 errors, (t=4), and in one embodiment of the invention a random number is chosen for the number of bits to be in error, (s) with s≤4.

A truly random source such as a thermal noise source as described above produces the most secure results, but a pseudo random generator can be used instead, particularly if seeded from the time of day with fine time resolution such as 1 mS. If the number of random errors chosen is too few, the security of the digital cryptogram will be compromised. Correspondingly the minimum number of errors chosen is a design parameter depending upon the length of the Goppa code and t, the number of correctible errors. A suitable choice for the minimum number of errors chosen in practice lies between t/2 and t. If the cryptogram is likely to be subject to additional errors due to transmission over a noisy or interference prone medium such as wireless, or stored and read using an imperfect reader such as in barcode applications, then some embodiments of the invention can correct these additional errors as well as the deliberately introduced errors provided the total number of errors is no more than t errors. For such applications typically the number of deliberate errors is constrained to be between t/3 and 2t/3.

For the example above, consider that the number of bit errors is 3 and these are randomly chosen to be in positions 4, 11 and 27 (starting the position index from 0). The bits in these positions in the codeword are inverted to produce the result
{1 1 0 0 1 1 1 0 0 1 1 1 0 1 0 1 1 1 1 0 1 1 1 0 1 1 0 1 0 0 0 1}.
The digital cryptogram is the resulting corrupted codeword and this is transmitted or stored depending upon the application.

Figure 6:
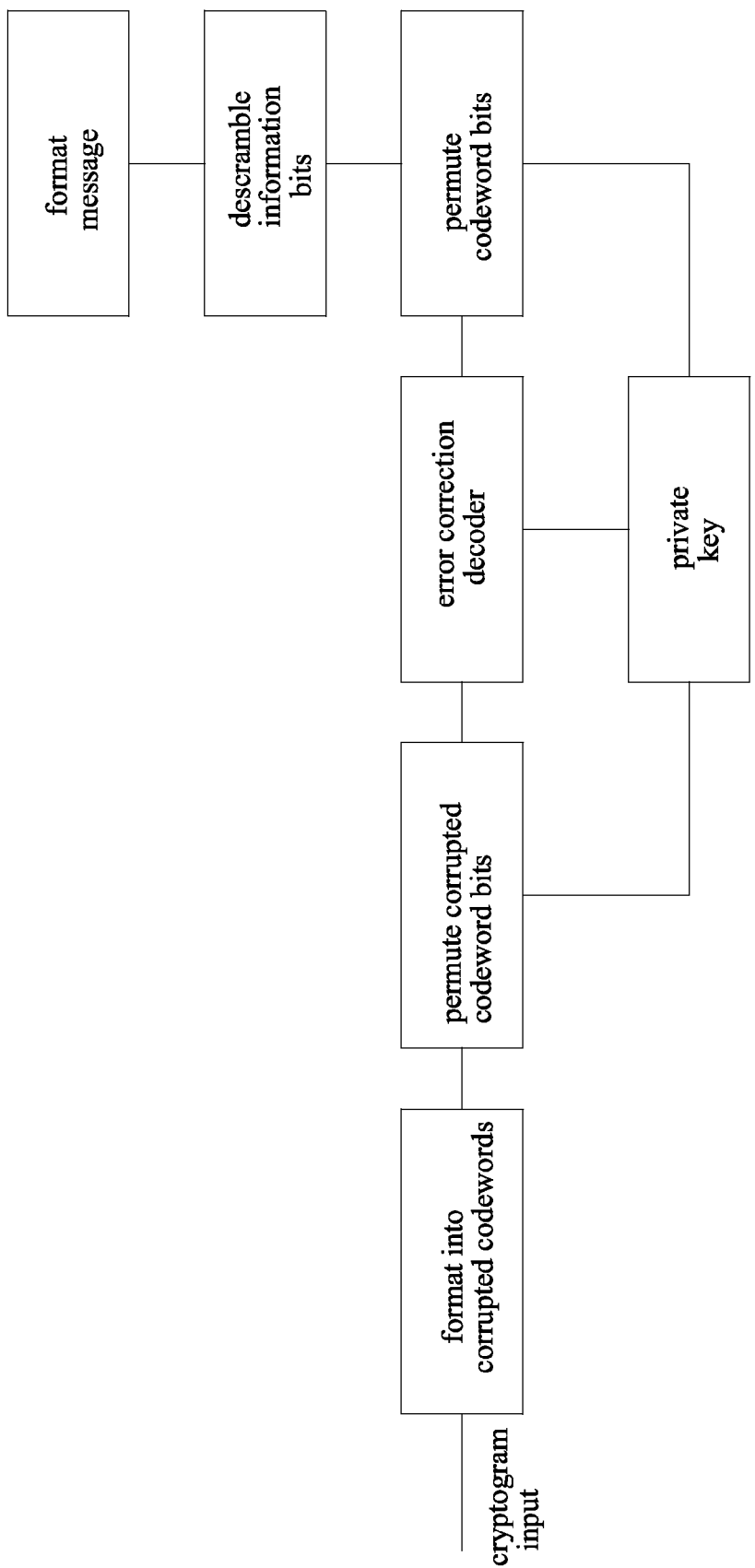
FIG. 6 shows a Private Key decryption system according to an embodiment of the invention.

The intended recipient of this cryptogram retrieves the message in a series of steps. FIG. 6 shows the system used for decryption. The retrieved cryptogram is formatted into corrupted codewords by the block format into corrupted codewords shown in FIG. 6. For the example above, the recipient first receives or otherwise retrieves the cryptogram
{1 1 0 0 1 1 1 0 0 1 1 1 0 1 0 1 1 1 1 0 1 1 1 0 1 1 0 1 0 0 0 1}.
It is assumed in this example that no additional errors have occurred although with this particular example one additional error can be accommodated.

In all embodiments of the invention, the private key contains the information of which Goppa code was used and a first permutation sequence which when applied to the retrieved, corrupted codewords which make up the cryptogram produces corrupted codewords of the Goppa code with the bits in the correct order. In most embodiments of the invention, the private key also contains a second permutation sequence which when applied to the error corrected Goppa codewords puts the scrambled information bits in natural order. In some embodiments of the invention, the private key also contains a third permutation sequence which when applied to the error vectors found in decoding the corrupted Goppa codewords puts the bit errors in the same order that they were when inserted during encryption. All of this information is stored in the block private key in FIG. 6. Other information necessary to decrypt the cryptogram, such as the descrambler required, is implicit and depends upon the particular embodiment.

For this embodiment of the invention there are two permutation sequences stored as part of the private key and the decryption arrangement is shown in FIG. 6. The corrupted codewords retrieved from the received or read cryptogram are permuted with a first permutation sequence which will put the bits in each corrupted codeword in the same order as the Goppa codewords. In this example, the first permutation sequence stored as part of the private key is:

$$24\ 11\ 3\ 23\ 2\ 17\ 20\ 8\ 13\ 30\ 31\ 14\ 15\ 22\ 7\ 1\ 9\ 6\ 21\ 4$$
$$10\ 5\ 28\ 26\ 19\ 16\ 25\ 0\ 27\ 12\ 18\ 29 \qquad (44)$$

This defines the following permutation input and output sequences:

$$0\ 1\ 2\ 3\ 4\ 5\ 6\ 7\ 8\ 9\ 10\ 11\ 12\ 13\ 14\ 15\ 16\ 17\ 18\ 19\ 20$$
$$21\ 22\ 23\ 24\ 25\ 26\ 27\ 28\ 29\ 30\ 31\ 27\ 15\ 4\ 2\ 19$$
$$21\ 17\ 14\ 7\ 16\ 20\ 1\ 29\ 8\ 11\ 12\ 25\ 5\ 30\ 24\ 6\ 18\ 13$$
$$3\ 0\ 26\ 23\ 28\ 22\ 31\ 9\ 10 \qquad (45)$$

so that for example bit 23 becomes bit 3 after permutation and bit 30 becomes bit 9 after permutation. The resulting, permuted corrupted codeword is
{1 1 0 0 0 1 1 0 1 0 1 0 1 1 0 1 1 1 1 1 1 1 0 0 0 1 1 1 1 0 1 0}.

The permutation is carried out by the block permute corrupted codeword bits shown in FIG. 6 with the first permutation sequence input from the block private key.

Following the permutation of each corrupted codeword, the codeword bits are in the correct order to satisfy the parity check matrix, matrix 19 if there were no codeword bit errors. (In this case all of the syndrome values would be equal to 0). The next step is to treat each bit in each permuted corrupted codeword as a $GF(2^5)$ symbol with a 1 equal to $\alpha^0$ and a 0 equal to 0 and use the parity check matrix, matrix 19, stored as part of private key to calculate the syndrome values for each row of the parity check matrix. The syndrome values produced in this example, are respectively $\alpha^{30}$, $\alpha^{27}$, $\alpha^4$, and $\alpha^2$. In FIG. 6 the block error correction decoder calculates the syndromes as a first step in correcting the bit errors.

The errors are corrected using the syndrome values to produce an error free codeword from the Goppa code for each permuted corrupted codeword. There are several published algorithms for correcting bit errors for Goppa codes [9, 10, 11, 12]. For example the method described by Patterson [12] may be used. In the example above, the error free permuted codeword is obtained:
{1 0 0 0 0 1 1 0 1 0 1 0 1 1 0 1 1 1 1 0 1 1 0 0 0 1 1 1 0 0 1 0}
and the error pattern, defined as a 1 in each error position is
{0 1 0 0 0 0 0 0 0 0 0 0 0 0 0 0 0 0 0 0 1 0 0 0 0 0 0 0 1 0 0 0}.
As shown in FIG. 6 the block permute codeword bits takes the output of the block error correction decoder and applies the second permutation sequence stored as part of the private key to each corrected codeword.

In the example, consider that the following permutation input and output sequences is applied to the error free permuted codeword (the decoded codeword of the Goppa code).

$$27\ 15\ 4\ 2\ 19\ 21\ 17\ 14\ 7\ 16\ 20\ 1\ 29\ 8\ 11\ 12\ 25\ 5\ 30\ 24$$
$$6\ 18\ 13\ 3\ 0\ 26\ 23\ 28\ 22\ 31\ 9\ 10\ 0\ 1\ 2\ 3\ 4\ 5\ 6\ 7\ 8$$
$$9\ 10\ 11\ 12\ 13\ 14\ 15\ 16\ 17\ 18\ 19\ 20\ 21\ 22\ 23\ 24$$
$$25\ 26\ 27\ 28\ 29\ 30\ 31 \qquad (46)$$

The result is that the scrambled message bits correspond to bit positions {0 1 2 3 4 5 6 7 8 9 12 14} from the encryption procedure described above. The scrambled message bits may be placed in bit positions {0 1 2 3 4 5 6 7 8 9 10 11} by absorbing the required additional permutation into a permutation sequence defined by the following permutation input and output sequences:

27 15 4 2 19 21 17 14 7 16 29 11 20 8 1 12 25 5 30 24
6 18 13 3 0 26 23 28 22 31 9 10 0 1 2 3 4 5 6 7 8
9 10 11 12 13 14 15 16 17 18 19 20 21 22 23 24
25 26 27 28 29 30 31 (47)

The second permutation sequence which corresponds to this net permutation and which is stored as part of the private key, private key shown in FIG. 6 is:

24 14 3 23 2 17 20 8 13 30 31 11 15 22 7 1 9 6 21 4
12 5 28 26 19 16 25 0 27 10 18 29 (48)

The second permutation sequence is applied by the block permute codeword bits. Since the encryption and decryption permutation sequences are all derived at the same time in forming the public key and private key from the chosen Goppa code, it is straightforward to calculate and store the net relevant permutation sequences as part of the public and private key respectively.

In the example applying the second permutation sequence to the error free permuted codeword produces the output of permute codeword bits. The first 12 bits of the result will be the binary vector {1 1 0 0 0 1 1 0 0 1 0 0} and it may be verified that this is identical to the scrambled message vector produced from the encryption operation. Represented as a polynomial the binary vector $1+x+x^5+x^6+x^9$.

As shown in FIG. 6 the next step is for the k information bits of each permuted error free codeword to be descrambled by descramble information bits. In this example descramble information bits is carried out by the descrambler arrangement shown in FIG. 5 with define taps corresponding to polynomial $1+x+x^3+x^4+x^7+x^8+x^{11}$.
The output of the descrambler in polynomial form is $(1+x+x^5+x^6+X^9)\cdot(1+x+x^3+x^4+x^7+x^8+x^{11})$ modulo $1+x^{12}$.
After polynomial multiplication, the result is $(x+x^3+x^{11})$ corresponding to a message {0 1 0 1 0 0 0 0 0 0 0 1}. It is apparent that this is the same as the original example message prior to encryption, verifying the decryption procedure using the private key.

The following is an example in this embodiment of the invention of using a random permutation sequence after encoding by $QT_{(32,12,9)}$ (32), the parity check matrix. Assuming for comparison purposes the same scrambled message is encoded as before, the encoded codeword prior to permutation is as before {1 1 0 0 0 1 1 0 0 1 0 0 1 0 1 1 1 1 1 0 1 1 1 0 1 1 0 0 0 0 0 1}.
Using the following permutation sequence.
11 23 14 17 28 24 1 13 3 18 6 21 27 2 4 20 25 0 9 5 31 8 19 7 26 10 29 15 30 12 16 22
so that the first codeword bit moves to position 11, the second to position 23, etc. The resulting permuted codeword is {1 1 0 0 1 0 0 0 1 1 1 1 0 0 0 0 0 1 1 1 0 1 1 1 1 1 1 0 0 0 1} and this will be output to the adder, add of FIG. 1.

With the same 3 bit error pattern in positions 4, 11 and 27 (starting the position index from 0) the output of format cryptogram is {1 1 0 0 0 0 0 0 1 1 1 0 0 0 0 0 0 0 1 1 1 0 1 1 1 1 1 0 0 0 0 1}.

This is input to the decryption arrangement shown in FIG. 6 as before. This time the first permutation sequence, part of the private key, required to put the cryptogram bits in the same order as the codeword symbols of the Goppa code is 26 2 17 7 14 0 31 3 4 16 22 21 20 19 13 23 18 1 8 28
27 24 30 29 5 25 10 11 15 6 9 12 (49)

This is used by permute corrupted codeword bits of FIG. 6 and in this example the resulting output is {1 0 0 0 0 1 1 0 0 0 1 0 1 1 0 1 1 1 1 0 0 1 0 0 0 1 1 0 0 0 1 0} with the bit errors permuted to positions 8, 20 and 27.

As before error correction decoder uses the parity check matrix of the Goppa code stored as part of the private key to calculate the 4 syndromes from the 4 parity check equations and this time these are $\alpha^9$, $\alpha^{18}$, $\alpha^2$ and $\alpha^{10}$. Using the calculated syndromes error correction decoder determines that the errors are in positions 8, 20 and 27 and that the codeword is found from {1 0 0 0 0 1 1 0 0 0 1 0 1 1 0 1 1 1 1 0 0 1 0 0 0 1 1 0 0 0 1 0}
by inverting the bits in these positions to produce the Goppa code codeword
{1 0 0 0 0 1 1 0 1 0 1 0 1 1 0 1 1 1 1 0 1 1 0 0 0 1 1 1 0 0 1 0}
It will be seen that this is the same Goppa code codeword as before.
Correspondingly shown in FIG. 6 permute codeword bits takes this output from error correction decoder and applies the same second permutation sequence stored as part of the private key as before 24 14 3 23 2 17 20 8 13 30 31 11 15 22 7 1 9 6 21 4
12 5 28 26 19 16 25 0 27 10 18 29 (50)

This produces the same permuted codeword as before and the first 12 bits of the result is the binary vector {1 1 0 0 0 1 1 0 0 1 0 0} which is descrambled to recover the original message.

Figure 7:
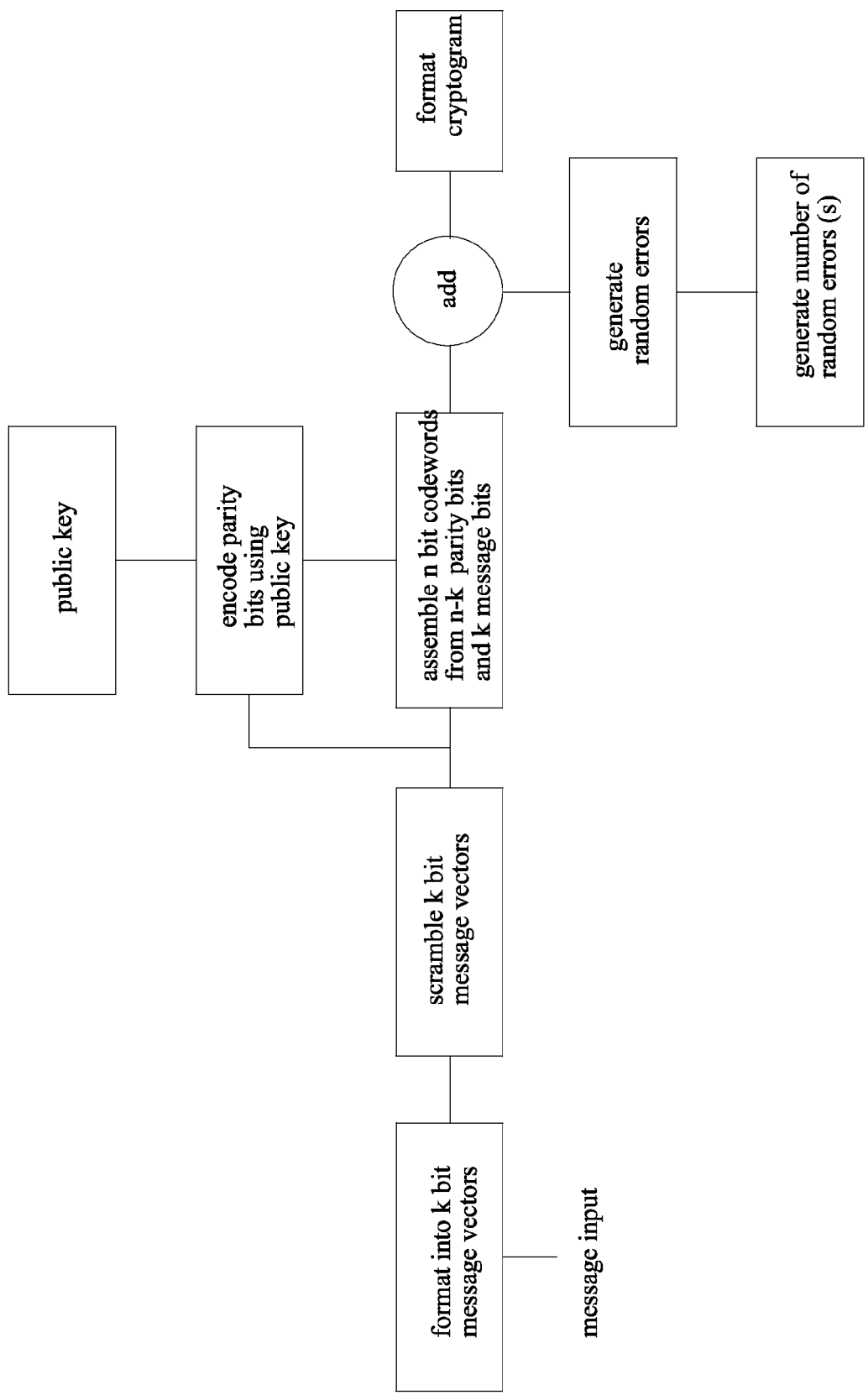
FIG. 7 shows a Public key encryption system with no permutation of encoded codewords according to an embodiment of the invention.

In other embodiments of the invention, the public key size is reduced further by eliminating the permutation following the encoding of each scrambled message vector into codewords. The encryption arrangement is shown in FIG. 7. The encryption arrangement is the same as shown in FIG. 1 except that having encoded each scrambled message vector using the parity check matrix, excluding the identity sub-matrix, stored in public key, assemble n bit codewords from n–k parity bits and k message bits does not carry out any permutation of the codeword bits according to a permutation stored as part of the public key but uses a fixed permutation or no permutation.

Considering as an example the same (32,28,5) Goppa code as before and the same column candidate order in deriving the reduced echelon generator matrix, then the same matrix, $QT_{(32,12,9)}$, the parity bit part of the generator matrix and the transpose of $QT_{(32,12,9)}$ defines the parity check matrix. The public key in these embodiments of the invention consists only of the n–k by k parity check matrix, minus the identity sub-matrix, which is smaller than the n by k generator matrix of the original McEliece system.

Considering the same example for the message vector and the same scrambler and with no permutation following encoding so that the parity bits follow the scrambled message vector, the encoded codeword is the systematic codeword {1 1 0 0 0 1 1 0 0 1 0 0 1 0 1 1 1 1 1 0 1 1 1 0 1 1 0 0 0 0 0 1}.

With the same 3 bit error pattern as before in positions 4, 11 and 27 (starting the position index from 0) the output of format cryptogram is
{1 1 0 0 1 1 0 0 1 0 1 1 0 1 1 1 1 1 0 1 1 1 0 1 1 0 1 0 0 0 1}
which forms the cryptogram.

The decryption arrangement for this embodiment of the invention is the same as before and is as shown in FIG. 6. The first permutation sequence is different from the earlier examples and so this part of the private key is different but the remaining parts of the private key, the second permutation sequence is the same as the earlier two examples. The first permutation sequence that is required to put the corrupted codeword bits in the correct order so that they are in the same order as for the Goppa code codewords is 24 13 3 23 2 17 20 8 14 30 31 11 15 22 7 1 9 6 21 4
12 5 28 26 19 16 25 0 27 10 18 29 (51)

The decryption procedure following permutation of the received cryptogram with this permutation sequence is the same as described before with calculation of syndromes, determination of error positions, correcting the bit errors, permutation of resulting codewords, descrambling followed by formatting of the recovered message.

Figure 8:
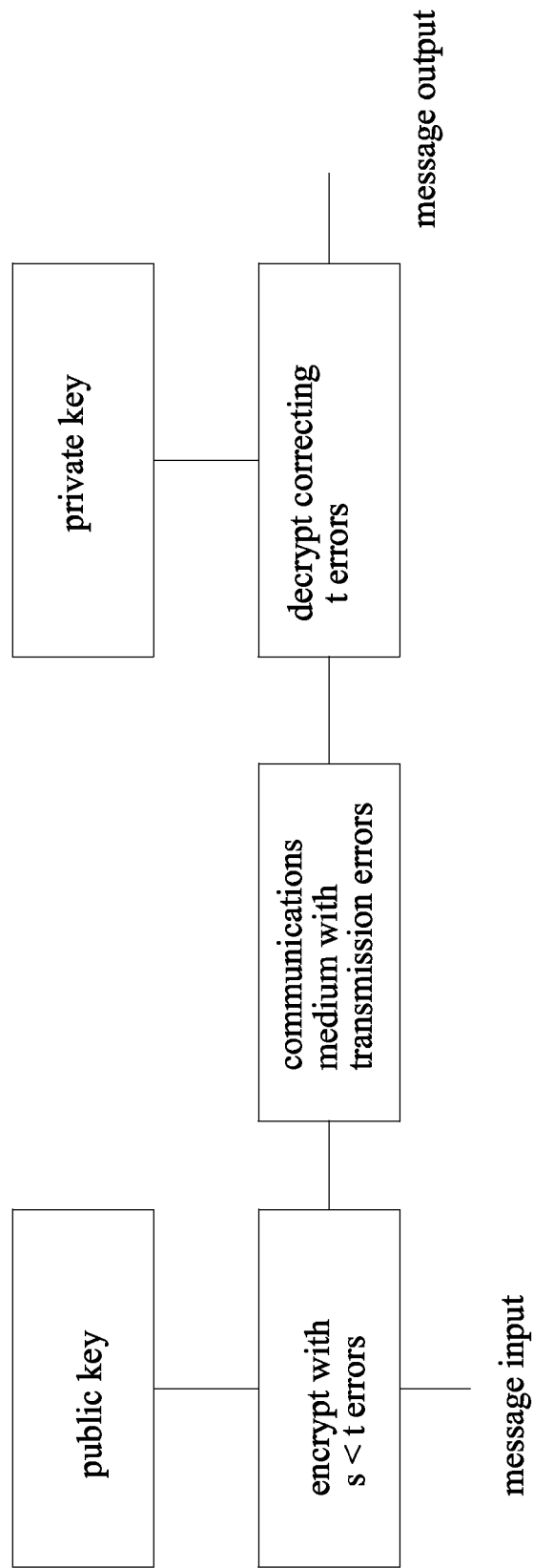
FIG. 8 shows a Public key encryption system correcting communication transmission errors according to an embodiment of the invention.

The encryption arrangement of FIG. 1 or FIG. 7 together with the decryption arrangement shown in FIG. 6 are able automatically to correct t−s errors occurring in the communication of the cryptogram as shown in FIG. 8. It makes no difference to the decryption arrangement of FIG. 6 whether the bit errors were introduced deliberately during encryption or were introduced due to errors in transmitting the cryptogram. A correct message is output after decryption provided the total number of bit errors is less than or equal to t, the error correcting capability of the Goppa code used to construct the public and private keys.

As an illustration, a (512, 287,51) Goppa code of length 512 bits with message vectors of length 287 bits can correct up to 25 bit errors, (t=25). With s=15, 15 bit errors are added to each codeword during encryption. Up to 10 additional bit errors can occur in transmission of each corrupted codeword and the message will be still recovered correctly from the received cryptogram.

Figure 9:
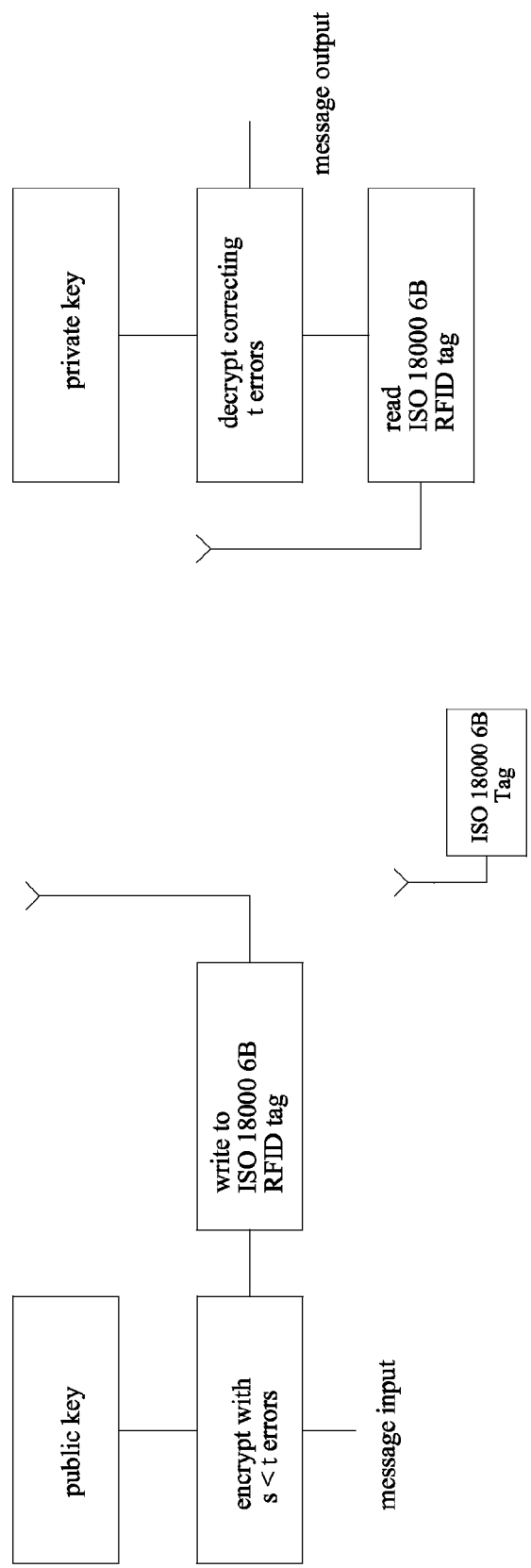
FIG. 9 shows a Public key encryption system correcting ISO 18000 6B RFID tag reading errors according to an embodiment of the invention.

These embodiments of the invention will also correct errors in the reading of cryptograms stored in data media. As an example, FIG. 9 shows a medium to long range ISO 18000 6B RFID system operating in the 860 MHz to 930 MHz with 2048 bits of user data being read back from a tag. A (2048, 1388,121) Goppa code of length 2048 bits with message vectors of length 1388 bits can correct 60 errors, (t=60). With s=25, 25 bit errors are added to the codeword during encryption and this is written to each tag as a cryptogram and stored in non-volatile memory. Up to 35 additional bit errors can occur in reading each passive tag and the message, the tag payload information of 1388 bits will be still recovered correctly from the information read from the tag.

Figure 10:
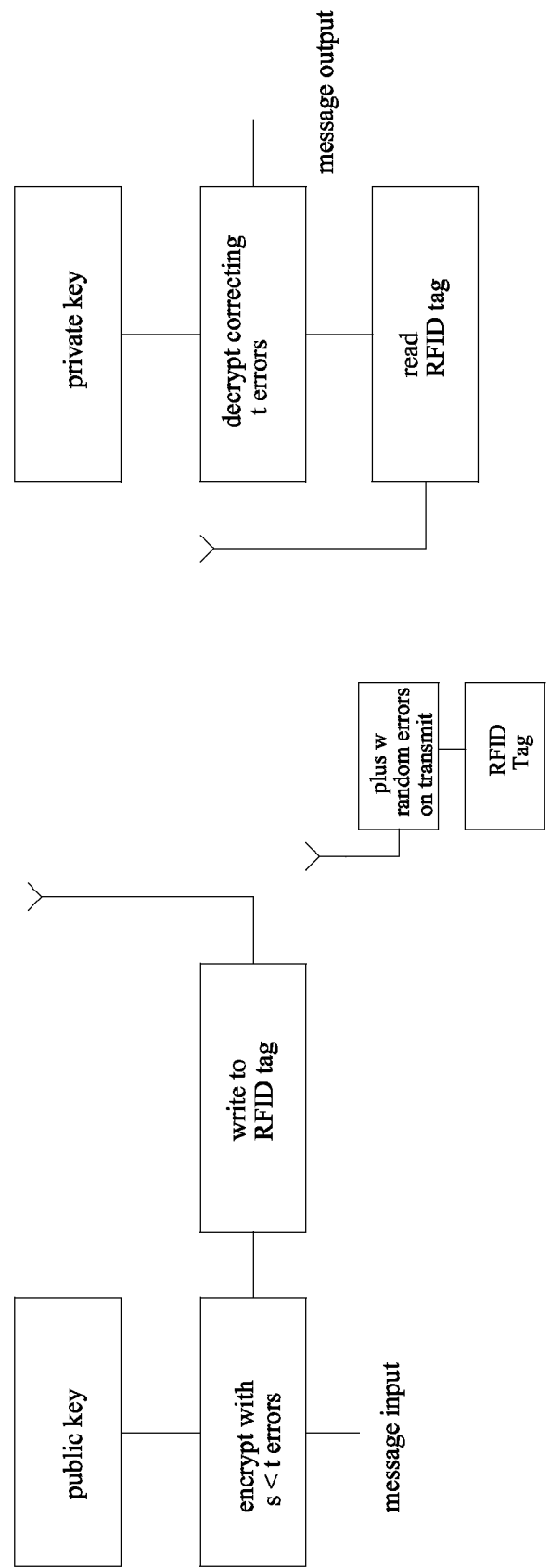
FIG. 10 shows a Public key encryption system providing authentication for RFID tags according to an embodiment of the invention.

In another embodiment of the invention, secure authentication is provided from communication or storage devices possessing little signal processing power. An example of this embodiment is shown in FIG. 10 being applied to a passive RFID system. Cryptograms containing encoded codewords, each with s bit errors, are transmitted using an RFID writer to an RFID tag and each cryptogram is stored in non-volatile memory in the tag. When requested by an RFD) reader, the tag transmits the cryptogram stored in memory and generates, using little signal processing power, w additional errors. The received, corrupted cryptogram is received by the reader and decrypted by correcting up to w+s errors in each corrupted codeword received to produce a message output. Authentication is provided by including within the stored encrypted message some secret information, such as a randomly generated number, known only to the RFID writer, subsequently stored encrypted in the tag and the RFID reader. The reader verifies that the secret information is present in the decrypted output for at least two times that the tag is read. Also the condition is imposed that each error pattern must differ from other error patterns in w−δ bit positions, where δ is a design parameter.

Tag cloning is a major problem in RFID where a tag is read and a duplicate tag made. With the above arrangement a duplicate tag will transmit corrupted codewords with 2w+s errors and reveal that it is a clone from the excessive number of errors. If the duplicate tag is constructed from a standard tag which does not add additional bit errors, the s+w bit errors present in each corrupted codeword will be in the same bit positions each time the duplicate tag is read, revealing that the tag is a clone.

Figure 11:
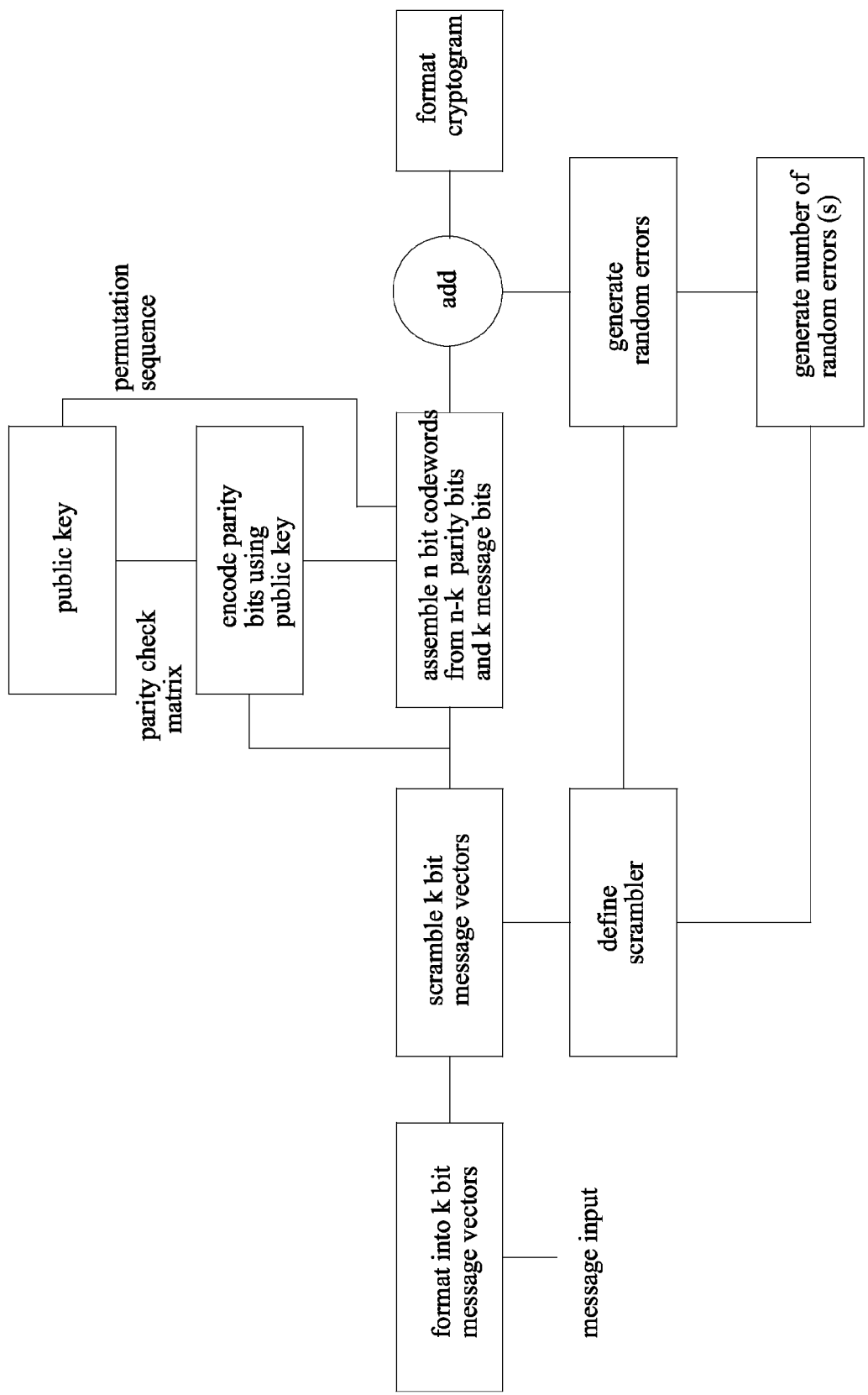
FIG. 11 shows a Public key encryption system with the message vector scrambler defined by error patterns, and codeword permutation according to an embodiment of the invention.
Figure 12:
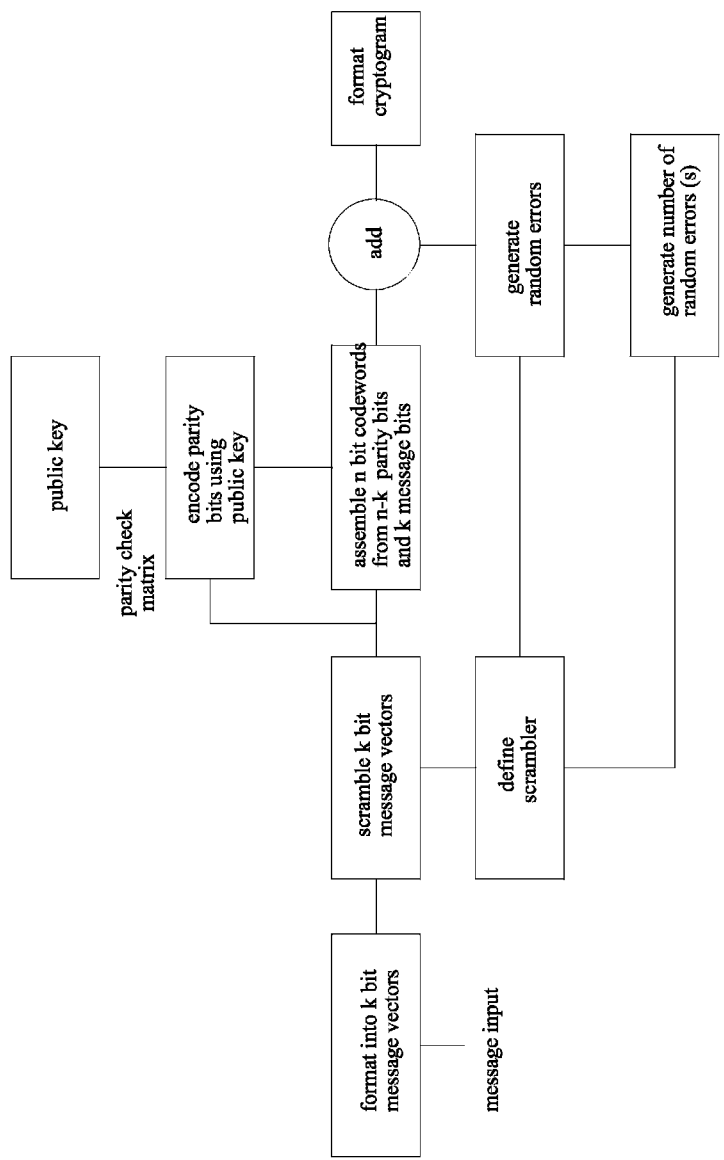
FIG. 12 shows a Public key encryption system with each message vector scrambler defined by each error pattern according to an embodiment of the invention.
Figure 13:
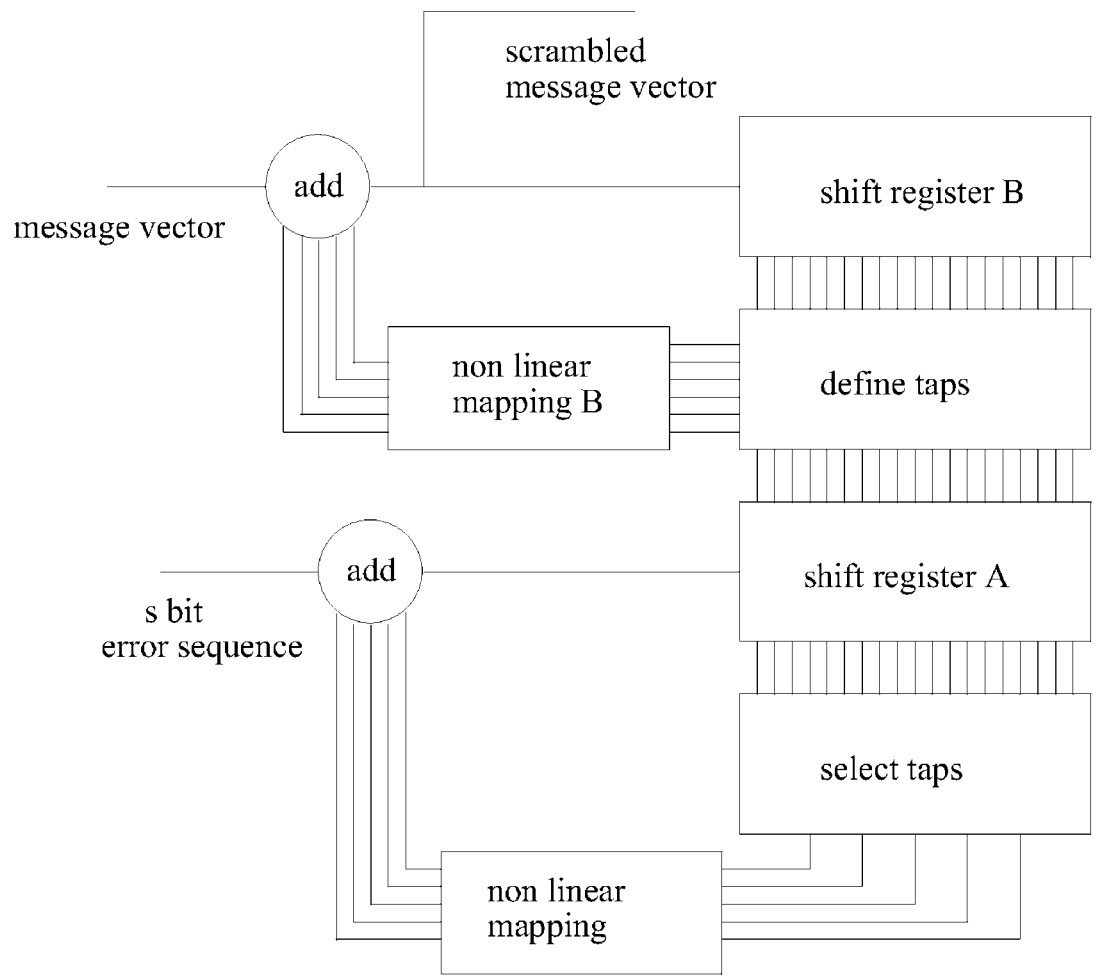
FIG. 13 shows a Message vector scrambling by non-linear feedback shift register with taps defined by s bit error pattern according to an embodiment of the invention.

For applications where there are no additional bit errors added to the cryptogram so that the only bit errors are those introduced during encryption the error patterns may be used to define the scrambler used to scramble each message vector in a similar technique to that described in afore-referenced GB1006747.8 (GB2469393). In these embodiments, there are two encryption arrangements as shown in FIG. 11 and FIG. 12 corresponding to permutation of the encoded codewords and no permutation of the encoded codewords. In both encryption arrangements the encoding of each k bit message vector starts with generate number of random errors(s) which is input to generate random errors which outputs an error pattern, a binary error vector n bits long consisting of all 0's except for the s bit positions, the error positions, which are 1's. The parameter s and the error vector are input to define scrambler which defines the scrambler to be used for scrambling the k bit message vector. One example of such a scrambling arrangement is shown in FIG. 13 which features a non-linear scrambling arrangement. Following the scrambling of each k bit message vector the rest of the encryption procedure is as described above for FIG. 1 and FIG. 7 respectively.

The scrambling arrangement example shown in FIG. 13 uses two non-linear feedback shift registers. The first operation is for the error vector, which is represented as a s bit sequence is input to a modulo 2 adder add whose output is input to shift register A as shown in FIG. 13. The non-linear feedback shift registers are the same as in FIG. 3 with operation as described above but select taps will usually have a different setting and non linear mapping also will usually have a different mapping, but this is not essential. After clocking the s bit error sequence into the non-linear feedback shift register, shift register A shown in FIG. 13 will essentially contain a random binary vector. This vector is used by define taps to define which outputs of shift register B are to be input to non linear mapping B whose outputs are added modulo 2 to the message vector input to form the input to shift register B shown in FIG. 13.

Figure 14:
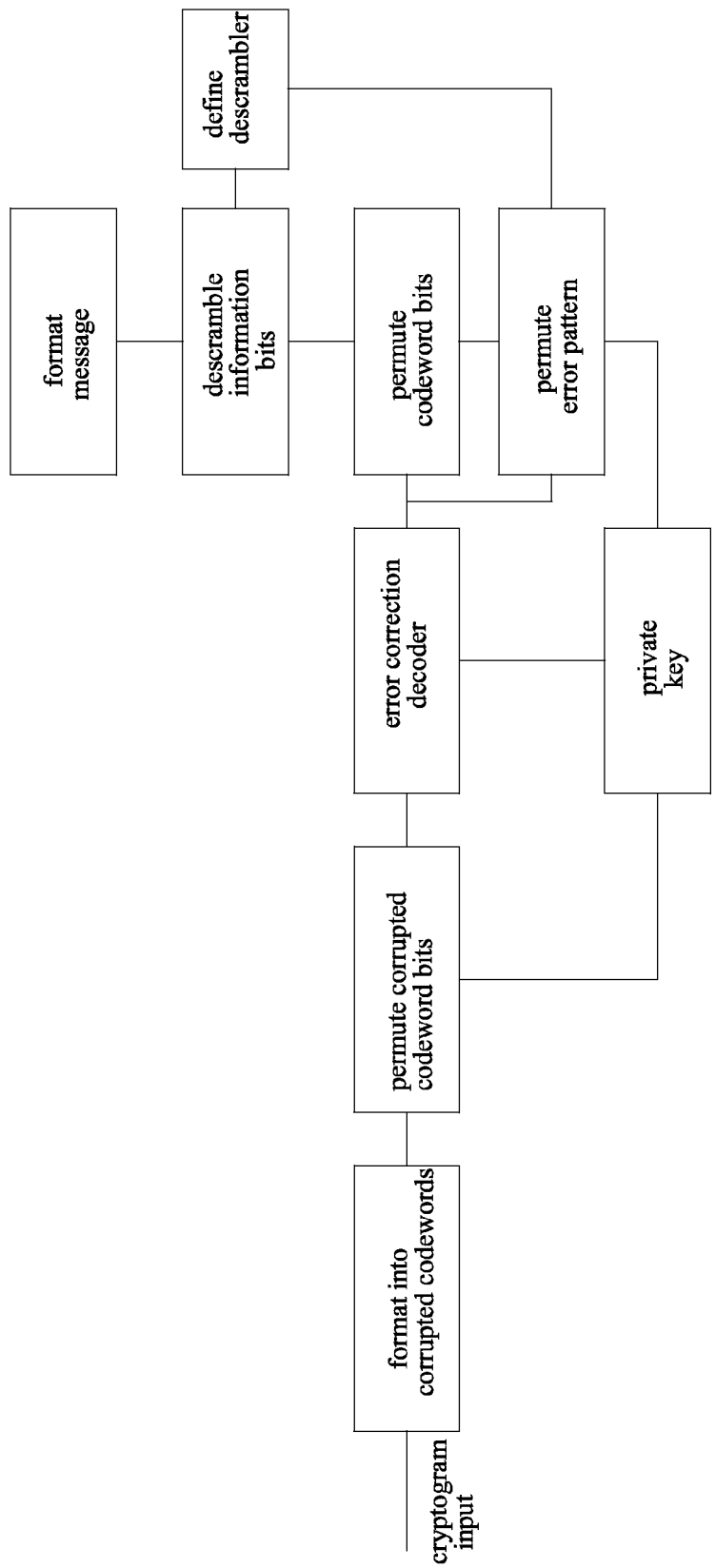
FIG. 14 shows a Public key decryption system with each message vector descrambler defined by each permuted error pattern according to an embodiment of the invention.

The decryption arrangement for these embodiments is shown in FIG. 14. The decryption follows that described for FIG. 6 above except that each error pattern found by error correction decoder is output by the decoder and permuted using a permutation sequence stored in the private key so that the bit errors are in the same bit positions as they were during encryption. For the encryption arrangement shown in FIG. 11 as the codeword bits are permuted prior to the addition of bit errors, a third permutation sequence needs to be stored in the private key to put the bit errors in the same bit positions as they were during encryption. For the encryption arrangement shown in FIG. 12 the codeword bits are in the same order as the error pattern bits and so the second permutation sequence stored in the private key places the bit errors in the same bit positions as they were during encryption.

Consequently each permuted error pattern which defines the descrambler, define descrambler in FIG. 14 is the same as the error pattern which defines the scrambler, define scrambler in FIG. 11 and FIG. 12. As before the type of descrambler used needs to provide the inverse function to that of the scrambler.

Figure 15:
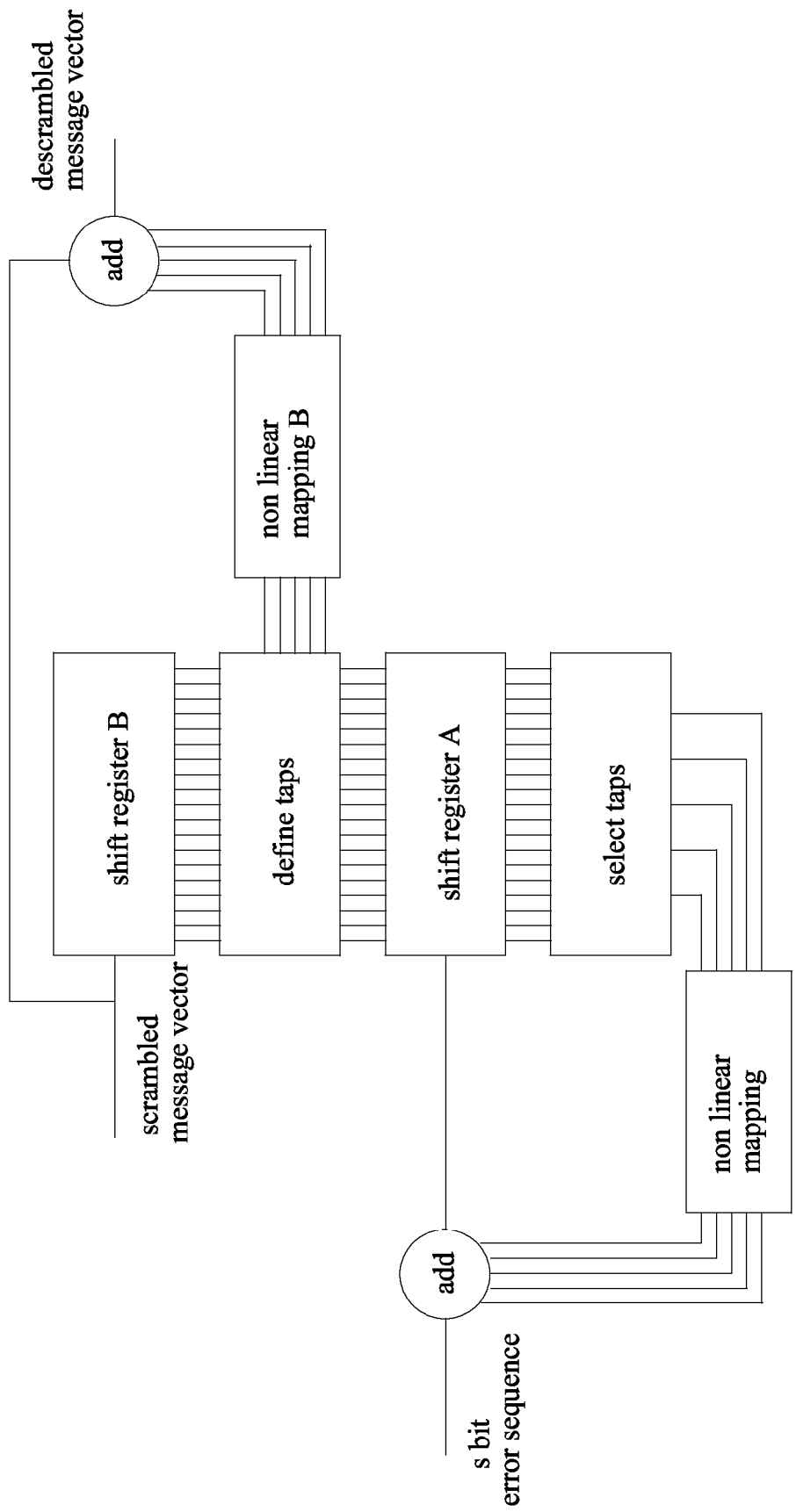
FIG. 15 shows a Descrambling independently each scrambled message vector by non-linear feedback shift register with taps defined by s bit error pattern according to an embodiment of the invention.

For the example of the non-linear scrambling arrangement, the corresponding define descrambler and subsequent descrambling is shown in FIG. 15. As in the scrambler, the s bit error sequence is input to a modulo 2 adder add whose output is input to shift register A as shown in FIG. 15. After clocking the s bit error sequence into the non-linear feedback shift register, shift register A shown in FIG. 15 will contain exactly the same binary vector as shift register A of FIG. 13.

Consequently, exactly the same outputs of shift register B to be input to non linear mapping B will be defined by define taps. Moreover, comparing the input of shift register B of the scrambler FIG. 13 to the input of shift register B of the descrambler FIG. 15, it will be seen that the contents are identical and equal to the scrambled message vector.

Consequently, the same selected shift register outputs will be identical and with the same non-linear mapping non linear mapping B the outputs of non linear mapping B in FIG. 15 will be identical to those that were the outputs of non linear mapping B in FIG. 13. The result of the addition of these outputs modulo 2 with the scrambled message vector is to produce the original message vector at the output of add in FIG. 15.

This is carried out for each scrambled message vector and its associated error vector to recover the original message.

Figure 16:
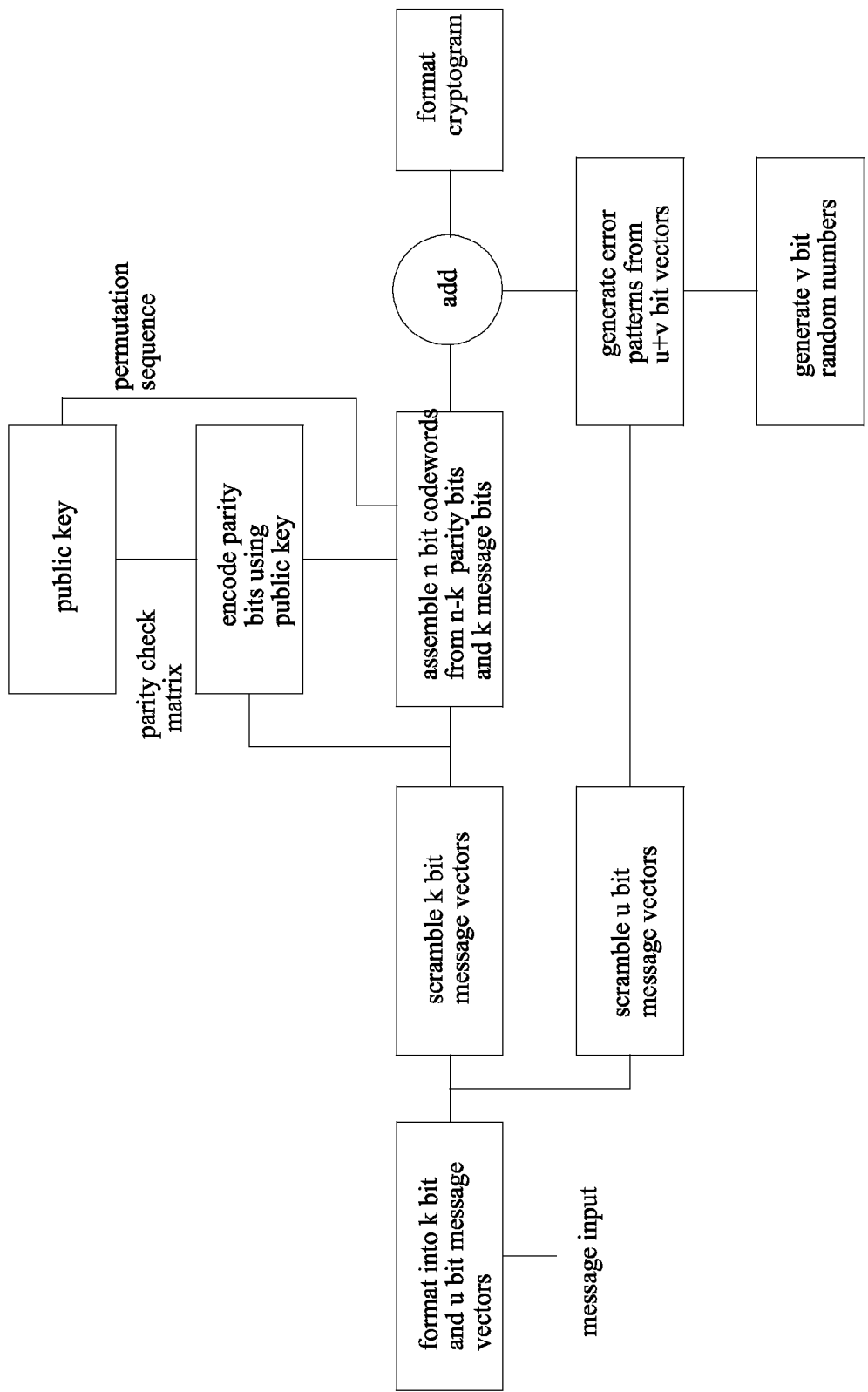
FIG. 16 shows a Public key encryption with high throughput according to an embodiment of the invention.

In a further embodiment the throughput is increased for those applications where there are no additional bit errors added to the cryptogram. The error patterns added to each encoded codeword are partially derived from scrambled message information. The encryption arrangement for this embodiment is shown in FIG. 16. The message input is formatted into k bit message vectors and also u bit message vectors. The k bit message vectors are scrambled, encoded into codewords and permuted as described above. The u bit message vectors are scrambled using a similar scrambler to the k bit message vectors and are input to generate error patterns from u+v bit vectors. The v bit vectors are generated by a random number generator, generate v bit random numbers. It is useful to consider an example such as a binary Goppa code with parameters (256,128,33) which has t=16, correcting 16 bit errors. The number of possible error patterns is a very large number: 100787516020223138746332000. An 83 bit number defines 9671406556917033397649408 of these error patterns. Correspondingly an error pattern generator with an 83 bit input can generate unambiguously each one of 9671406556917033397649408 possible error patterns having 16 bit errors which can be corrected, and hence found unambiguously, by the error correction decoder. For this example v could be set to 23 and u set to 60. Each corrupted codeword now conveys 128+60=188 message bits instead of 128 message bits as in previous embodiments.

There are a number of methods of generating the error patterns from a binary input and the inverse operation of generating a binary vector from an error pattern, necessary in decryption. A particularly fast method is based on the revolving door algorithm [13]. The improvement in throughput with this embodiment is quite significant as indicated by Table 3 for Goppa codes of length 1024 bits.

For example the (1024,524,101) binary Goppa code can correct 50 bit errors, has 524 information bits and the standard McEliece encryption system will provide a throughput of 51%. From Table 3 the error patterns can convey u+v=284 additional bits of information. The corresponding maximum throughput is 79% assuming the number of random bits, v, is chosen to be zero.

TABLE 3

Various Goppa codes of length 1024 bits and information that can be conveyed in error patterns.

| Length (n) | Information bits (k) | Correctible errors (t) | u + v | Message bits | Max throughput % |
|---|---|---|---|---|---|
| 1024 | 824 | 20 | 138 | 962 | 94 |
| 1024 | 724 | 30 | 191 | 915 | 89 |
| 1024 | 624 | 40 | 239 | 863 | 84 |

TABLE 3-continued

Various Goppa codes of length 1024 bits and information that can be conveyed in error patterns.

| Length (n) | Information bits (k) | Correctible errors (t) | u + v | Message bits | Max throughput % |
|---|---|---|---|---|---|
| 1024 | 524 | 50 | 284 | 808 | 79 |
| 1024 | 424 | 60 | 325 | 749 | 73 |
| 1024 | 324 | 70 | 364 | 688 | 67 |
| 1024 | 224 | 80 | 400 | 624 | 61 |

Figure 17:
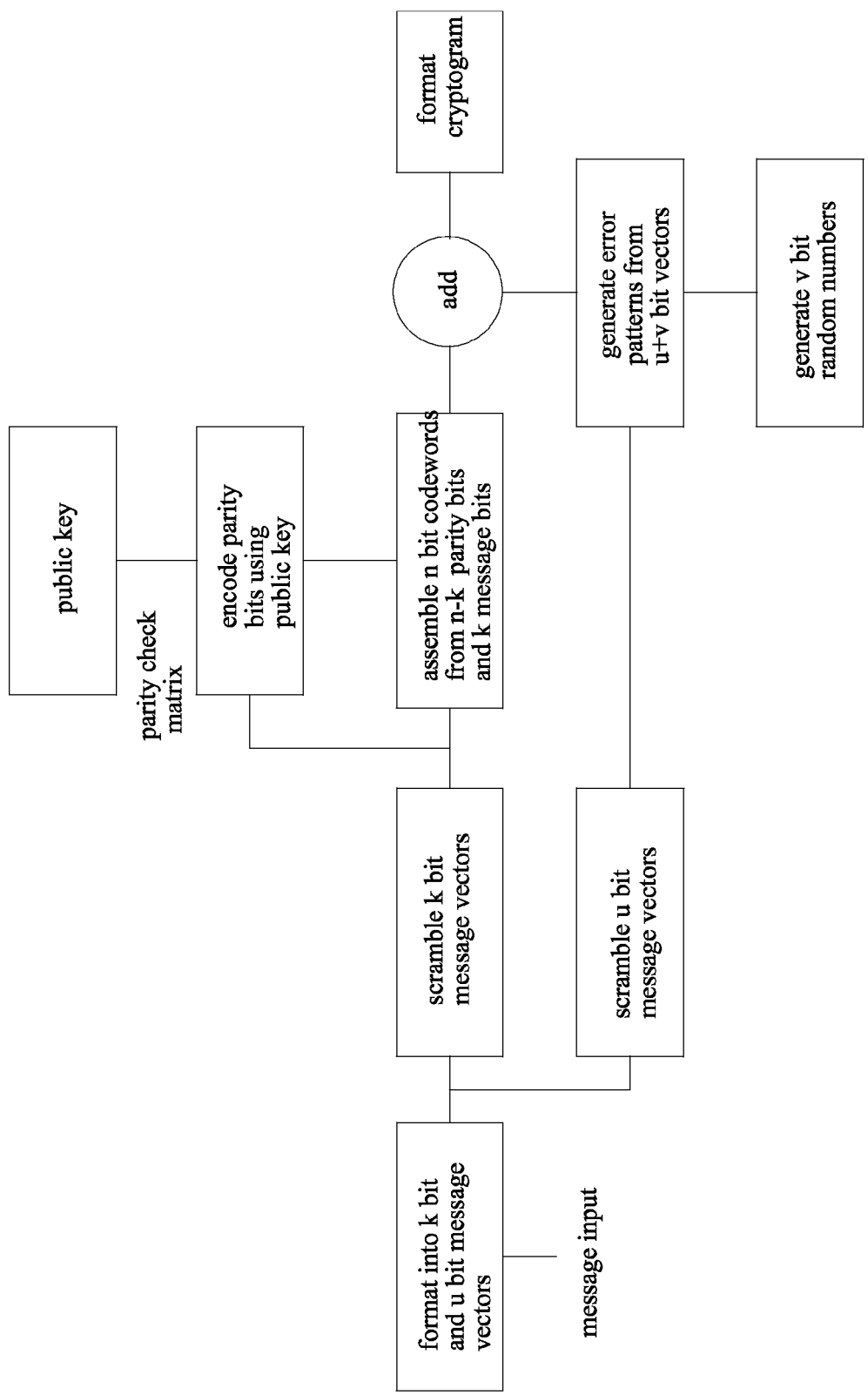
FIG. 17 shows a Public key encryption with high throughput without codeword permutation according to an embodiment of the invention.

The encryption arrangement where encoded codewords are not permuted is shown in FIG. 17 which is identical to FIG. 16 except that there is no permutation of encoded codeword bits and the public key does not need to include a permutation sequence. Apart from this aspect the mode of operation for the arrangement shown in FIG. 17 is the same as described for FIG. 16 above.

Figure 18:
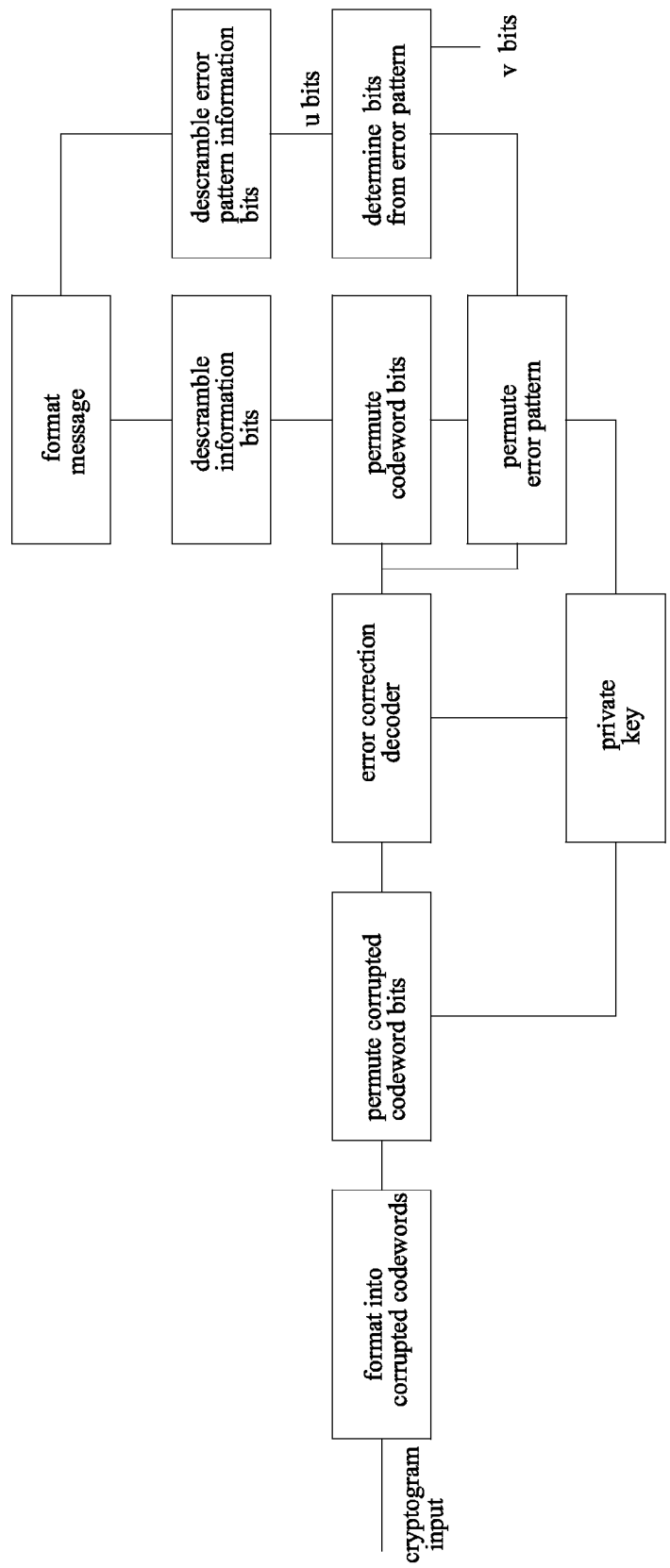
FIG. 18 shows a Decryption arrangement for public key encryption with high throughput according to an embodiment of the invention.

The decryption arrangement for this high throughput embodiment using either encryption arrangement is shown in FIG. 18. Decryption follows the same procedure as in previous embodiments up to the output of the error correction decoder. For each corrupted codeword the error correction decoder outputs an error corrected codeword and the associated error pattern as indicated in FIG. 18. Each corrected codeword and each associated error pattern is permuted with separate permutation sequences stored in the private key so that the permuted codewords are in the same order as when encoded and the permuted error patterns are in the same order as when generated during encryption.

The u+v bit pattern that defines each permuted error pattern is derived in determine bits from error pattern. In this embodiment the v bit vectors are not used, only the u bit vectors are used. Each u bit vector is output to descramble error pattern information bits which descrambles each u bit vector into a u information bit vector which is combined with each descrambled k information bit vector corresponding to each permuted corrected codeword. The decrypted message is formatted from all of the descrambled u information bit vectors and the descrambled k information bit vectors by format message as shown in FIG. 18.

Figure 19:
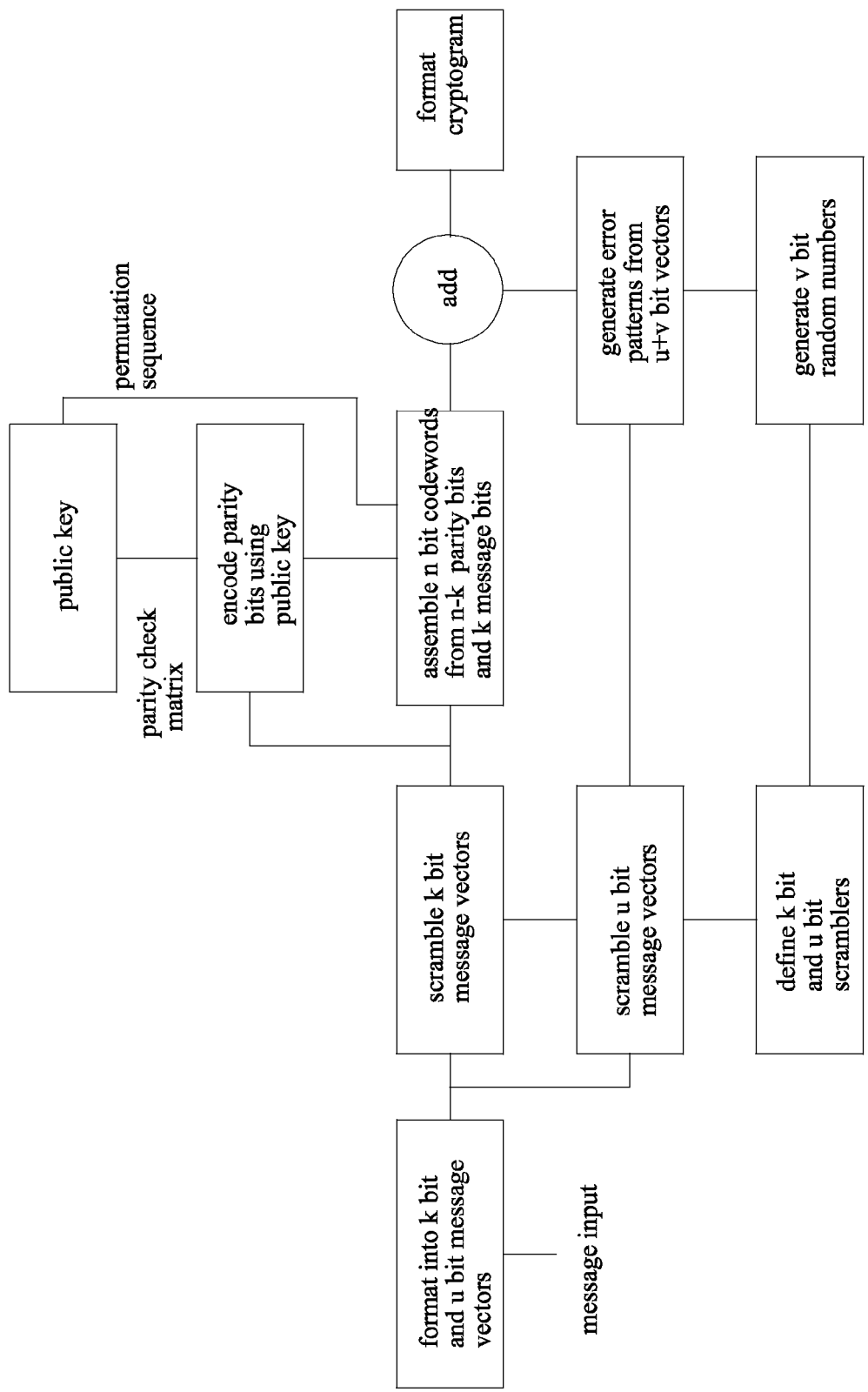
FIG. 19 shows a Public key encryption with high throughput and with scramblers defined by partial error pattern according to an embodiment of the invention.

This high throughput embodiment of the invention may be made semantically secure (different cryptograms are produced in each encryption for the same message and the same key) by using the generated v bit random numbers to define the k bit and u bit scramblers as shown by the encryption arrangement of FIG. 19 instead of using fixed scramblers.

For this embodiment the message input is split into an integral number of k bit and u bit information vectors after padding the message input as necessary. Encryption of each k bit and u bit information vector starts with generate v bit random numbers shown in FIG. 19. The v bit random number defines the scrambler used for scrambling the k bit information vector. It also defines the scrambler used for scrambling the u bit information vector. A different scrambler will be used for each k bit and u bit information vector depending on the v bit random number. Each u bit scrambled information vector is used together with its corresponding v bit random number to define a unique error pattern by generate error patterns from u+v bit vectors which are added to permuted, encoded codewords as in earlier embodiments.

Figure 20:
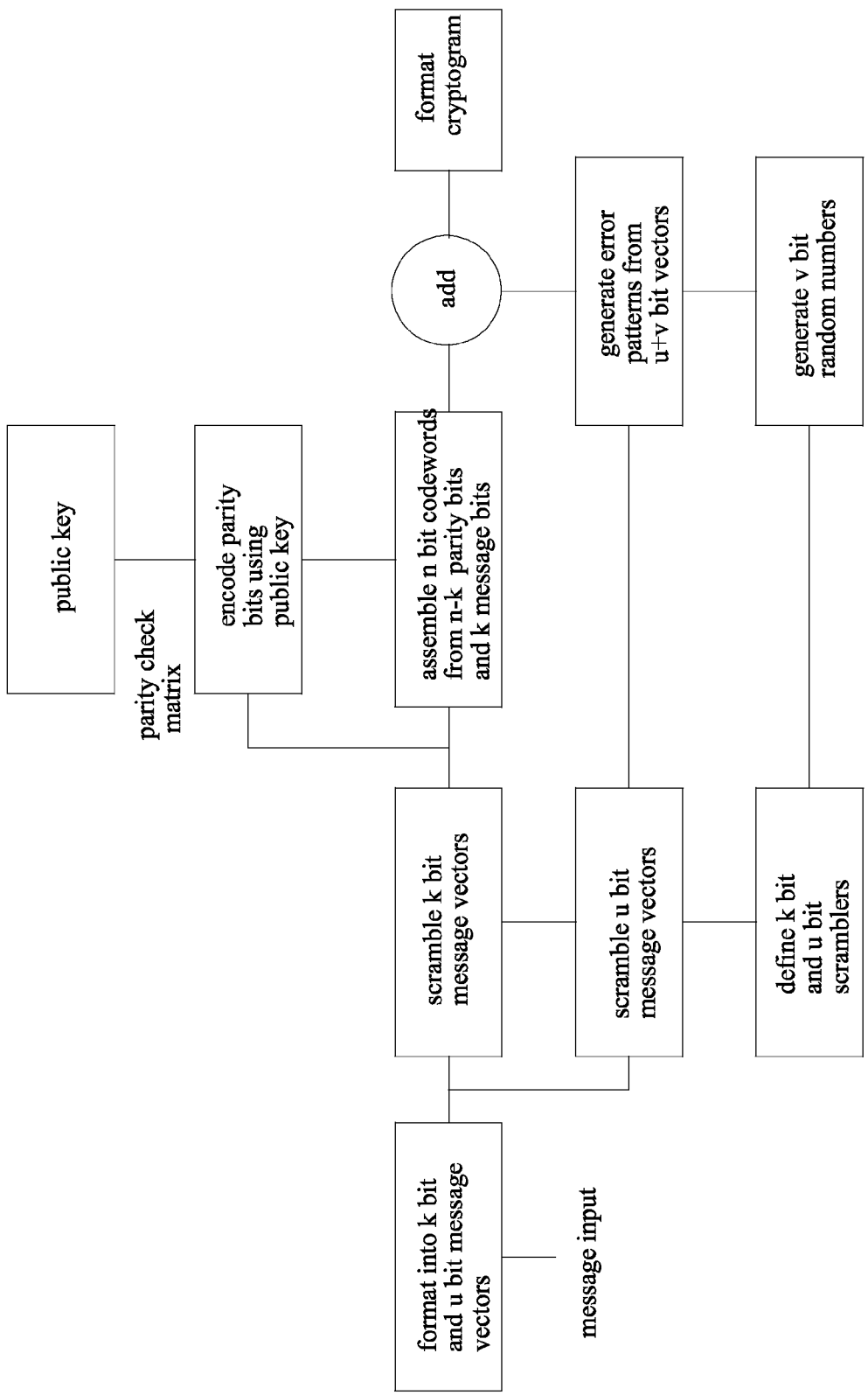
FIG. 20 shows a Public key encryption with high throughput and with scramblers defined by partial error pattern, without codeword permutation according to an embodiment of the invention.

The encryption arrangement where encoded codewords are not permuted is shown in FIG. 20 which is identical to FIG. 19 except that there is no permutation of encoded codeword bits and the public key does not need to include a permutation sequence. Apart from this aspect the mode of operation for the arrangement shown in FIG. 20 is the same as described for FIG. 19 above.

Figure 21:
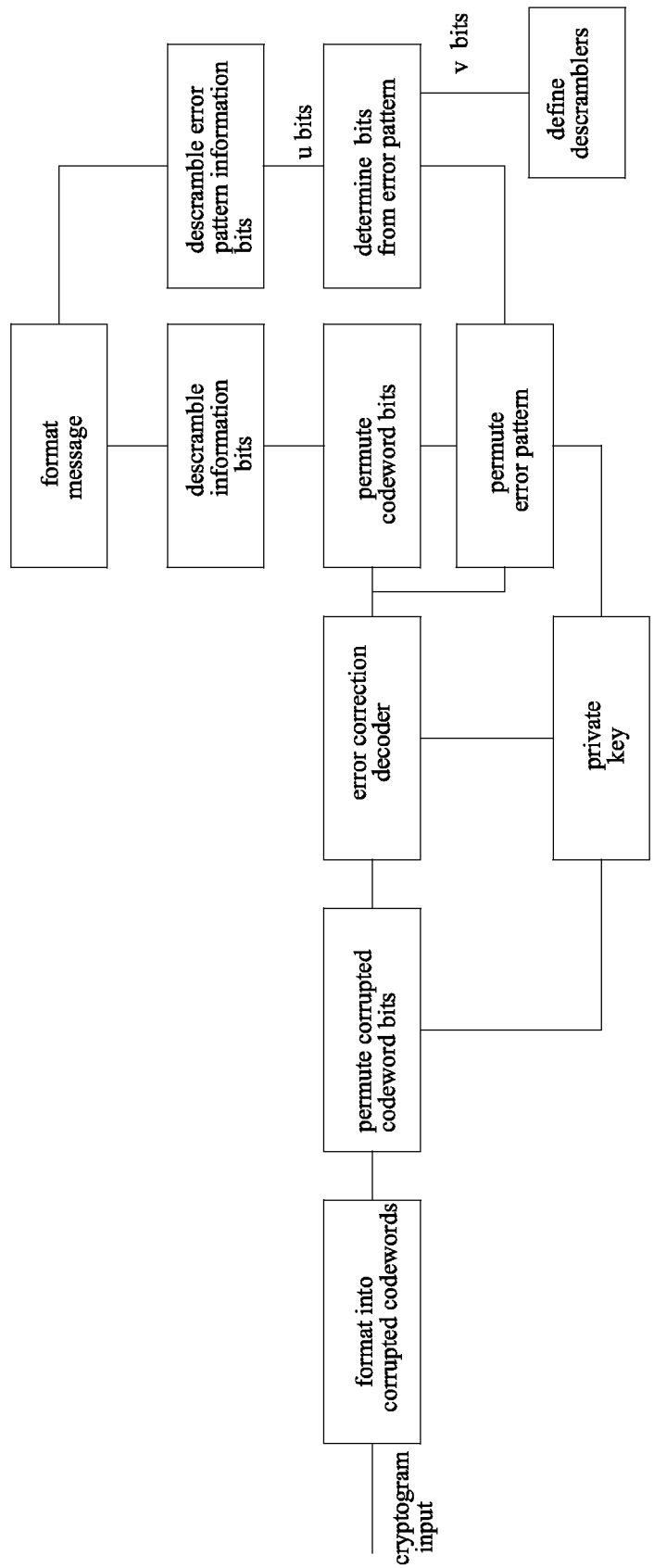
FIG. 21 shows a Decryption arrangement for public key encryption with high throughput and with descramblers defined by partial error pattern according to an embodiment of the invention.

Decryption for these semantically secure, high throughput embodiments is carried out by the arrangement shown in FIG. 21. Decryption follows the procedure of previous embodiments up to the output of the error correction decoder. For each corrupted codeword the error correction decoder outputs an error corrected codeword and the associated error pattern as indicated in FIG. 21. Each corrected codeword and each associated error pattern is permuted with separate permutation sequences stored in the private key so that the permuted codewords are in the same order as when encoded and the permuted error patterns are in the same order as when generated during encryption. The u+v bit pattern that defines each permuted error pattern is derived in determine bits from error pattern. The v bit vectors define the u bit and k bit descramblers to be used by define descramblers shown in FIG. 21. Each u bit vector is output to descramble error pattern information bits which descrambles each u bit vector into a u information bit vector which is combined with each descrambled k information bit vector corresponding to each permuted corrected codeword. The decrypted message is formatted from all of the descrambled u information bit vectors and the descrambled k information bit vectors by format message as shown in FIG. 21.

The various embodiments of this public key encryption invention use a reduced echelon generator matrix to generate codewords of a permuted binary Goppa code. As these codes are linear binary codes, it is straightforward to shorten the (nl,kl,d) permuted binary Goppa code to a (n,k,d) shortened code by setting some information bits always to 0's and in particular cases some parity bits to 0's, depending on the minimum weight codewords of the dual code as taught by MacWilliams and Sloane [6].

In the various embodiments of the invention that feature permutation of the encoded codewords, the bits that always have value 0 may be permuted to the end of the permuted codeword vector occupying positions $n1-1$ to $n1-k1+k-\mu$ where $\mu$ is a small integer corresponding to the number of parity bits that are always equal to zero. Effectively the bits in these positions are deleted. The error generator is constrained in these cases so that bit errors are never added to the deleted bit positions. Accordingly the cryptogram is formatted using only bits in the n positions, 0 to $n1-k1+k-1$. In this way the length of the cryptogram may be closely matched to the available communications packet length or storage capacity. For example the EPC Class 1 Gen 2 RFID tag has an EPC field of 96 bits. Any of the Goppa codes of length 128 bits may be shortened to a length of 96 bits and so utilise all of the bits available in the RFID tag. One example is a (128,79,15) Goppa code which can correct 7 bit errors. The dual code has a minimum weight codeword of 22 and so one parity bit is always zero, if 21 information bits in the appropriate positions are set to zero. Hence, the (128,79,15) Goppa code can be shortened to a (96,48,15) code conveying 48 message bits in a 96 bit cryptogram. Using one of the high throughput embodiments up to 77 message bits can be conveyed in a 96 bit cryptogram.

Figure 22:
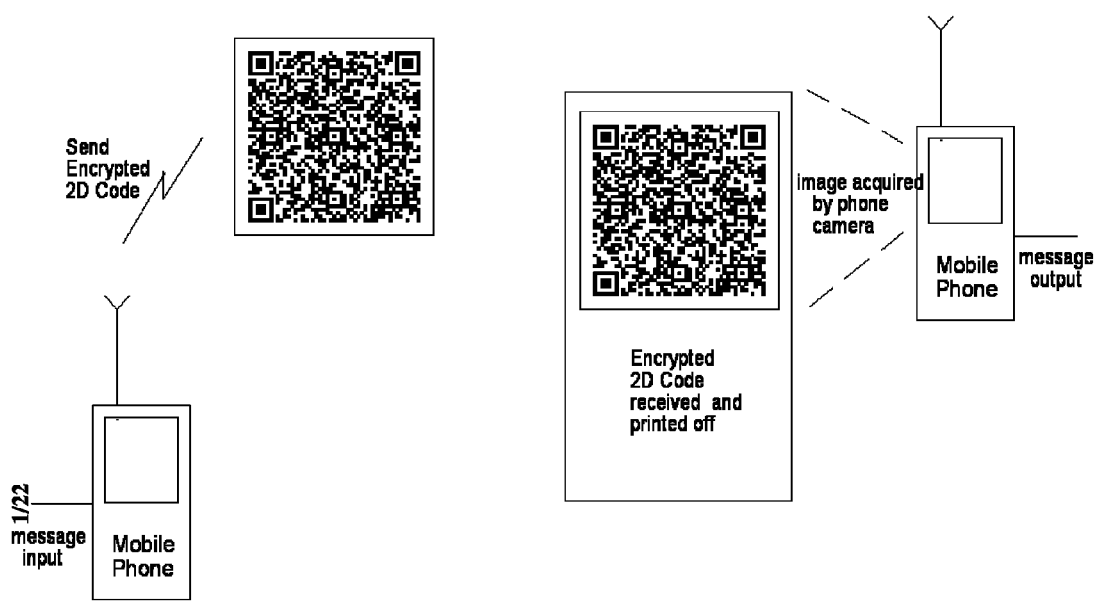
FIG. 22 shows an example of using the invention to encrypt a message onto a 2D barcode using a mobile phone.

An example of using the invention to encrypt a message onto a 2D barcode using a mobile phone is shown in FIG. 22. In one particular case encryption and decryption is implemented on an iPhone 4 as an app (such as that marketed by the present inventors under the name "Cloud Wallet"). The iPhone is used to input a message and using a public key derived from a (2048,1168,161) Goppa code the cryptogram is produced and stored in a Cloud network online storage, for example using propbox. The private key is itself encrypted using another Goppa code encoded onto a 2D barcode. The actual resulting 2D barcode is shown in FIG. 22. A binary image of the 2D barcode is transmitted by the iPhone to produce a printed copy. No encrypted information nor the private key is stored on the iPhone. Access to the encrypted information stored on Dropbox is provided by using the iPhone to recover the private key by capturing and decrypting the image of the 2D barcode from the printed copy and using it to decrypt cryptograms downloaded from propbox. Each cryptogram is decrypted within the iPhone, correcting the residual errors, to produce the original message as depicted in FIG. 22. The same app can also be used on an iPod Touch or iPad.

The App secures all the important voice, visual and text data and stores them in Dropbox for "anywhere" access. It has the following benefits:

Unique and device specific 2D barcode, access code, kept separately from a user's device, for authentication and access, no password to remember.

If a user loses the 2D barcode code, they can regenerate a new 2D barcode and the lost 2D barcode becomes useless immediately.

Stores a wide range of important voice, visual and text data.

Strong security: all information is encrypted and decrypted using the invention. Encryption and decryption is made transparent to the end user to ensure user-friendliness.

None of the encrypted information is stored on the device. Nothing is lost if the device is lost or stolen, and the data is always available from the cloud—encrypted by the user.

The encrypted information stored on propbox may be accessed by any of your iPhone, iPod Touch or iPad 2 devices with each device having its own unique 2D barcode If you have the invention operating on an iPhone, iPod Touch or iPad 2, each of the devices will be assigned a different 2D barcode. No one can use your iPhone's 2D bar code to access Cloud Wallet on your iPod Touch.

In summary, the invention may be used in a wide number of different applications such as active and passive RFID, secure barcodes, secure ticketing, magnetic cards, message services, e-mail applications, digital broadcasting, digital communications, wireless communications. video communications and digital storage.

The invention includes, but is not limited to, all embodiments within the scope of the claims appended hereto and also any and all novel subject-matter disclosed herein and combinations thereof, as well as all variations, modifications and substitutions to the embodiments described herein that fall within the scope of the present invention as defined by the claims.

REFERENCES

[1] R. Rivest, A. Shamir, L. Adleman, A Method for Obtaining Digital Signatures and Public-Key Cryptosystems, Communications of the ACM21(2), pp. 120126, 1978

[2] R. J. McEliece, A Public-Key Cryptosystem based on Algebraic Coding Theory, DSN Progress Report 42-44, 1978.

[3] V. D. Goppa, A new class of linear error-correcting codes, Probl. Inform. Transm, Vol 6, p.p. 24-30, 1970.

[4] J. Riek and G. McFarland, U.S. Pat. No. 5,054,066—Error correcting public key cryptographic method and program

[5] T. P. Berger, P. Cayrel, P. Gaborit, and A. Otmani, Reducing Key Length of the McEliece Cryptosystem AFRI- CACRYPT, volume 5580 of Lecture Notes in Computer Science, pp. 77-97, Springer, 2009.

[6] F. J. MacWilliams and N. J. A. Sloane, The Theory of Error Correcting Codes, North Holland, 1977

[7] S. Lin and D. J. Costello, Jr., Error Control Coding, 2nd ed., Pearson Prentice Hall, 2004

[8] J. Daemen and V. Rijmen, The Design of Rijndael: AES—The Advanced Encryption Standard, Springer, 2002.

[9] Y. Sugiyama, M. Kasahara, S. Hirasawa, and T. Namekawa, An erasures-and-errors decoding algorithm for Goppa codes, IEEE Trans. Inform. Theory, vol. IT-22, pp. 238241, March 1976.

[10] C. T. Retter, Decoding Goppa codes with a BCH decoder, IEEE Trans. Inform. Theory, vol. IT-21, p. 112, January 1975.

[11] E. R. Berlekamp, Algebraic Coding Theory, McGraw-Hill, 1968.

[12] N. J. Patterson, The algebraic decoding of Goppa codes, IEEE Transactions on Information Theory 21, p.p. 203-207.

[13] A. Nijenhuis, H. S. Wilf, Combinatorial algorithms, Academic Press, 1978

The invention claimed is:

1. A method of encrypting data by constructing a digital cryptogram by means of a public key algorithm comprising:
    (a) converting a message to be sent into binary form and formatting it by appending dummy bits as necessary into an integral number r of binary message vectors of length k bits each;
    (b) for each binary message vector, randomly generating an associated error vector of length n bits, containing s bit errors;
    (c) generating an associated reversible mapping function for each binary message vector from the associated error vector, wherein the reversible mapping function uses a k bit to k bit scrambling function that is derived from the associated error vector;
    (d) mapping each binary message vector into a different mapped binary message vector using the associated reversible mapping function;
    (e) constructing a first generator matrix of a binary code with dimension k with a pre-selected Galois field whose base field is 2, and a Goppa polynomial whose degree is such that the corresponding binary code provides a t error correcting capability by utilising n−k parity bits;
    (f) constructing a scrambled k×n generator matrix by matrix multiplication, said scrambled generator matrix being the product of a non-singular matrix, said first generator matrix and a first permutation matrix;
    (g) constructing a reduced echelon k×n generator matrix by randomly selecting k independent columns of the scrambled k×n generator matrix according to a second permutation matrix;
    (h) encoding each mapped binary message vector by adding rows of said reduced echelon generator matrix according to the 1s in each mapped message vector to form r codeword vectors of length n bits;
    (i) adding the associated error vector to each codeword vector using modulo 2 arithmetic to form r corrupted codeword vectors; and
    (j) forming a cryptogram from the r corrupted codeword vectors,
    wherein each of the steps (a)-(j) are executed by programmable hardware.

2. A method of encrypting data according to claim 1, further comprising using a third permutation matrix to permute the bits of each codeword.

3. The method of claim 2, further comprising reconstructing a message from the digital cryptogram by means of a private key algorithm comprising:
    (a) retrieving said cryptogram from a communications channel or storage medium as r retrieved vectors, each of length n symbols,
    (b) multiplying each retrieved vector by a first permutation matrix to obtain a codeword of the Goppa code used in creating the public key scrambled generator matrix, corrupted with no more than t bit errors,
    (c) applying an error correcting decoding algorithm to each corrupted codeword to form r binary codewords of the Goppa code and r error vectors,
    (d) multiplying each binary codeword of the Goppa code by a second permutation matrix,
    (e) multiplying each error vector by a third permutation matrix,
    (f) deriving from each permuted error vector a demapping function based on a k to k-bit descrambler,
    (g) selecting a mapped binary message vector of length k bits from each permuted codeword,
    (h) demapping each mapped binary message vector by the demapping function to form r demapped binary message vectors,
    (i) reformatting the r demapped binary message vectors by removing appended dummy bits to form the original digital message,
    wherein each of the steps (a)-(i) are executed on at least one processor.

4. A method of encrypting data according to claim 1, further comprising selecting the integer s such that s≤t for each codeword vector.

5. The method of claim 4, further comprising reconstructing a message from the digital cryptogram by means of a private key algorithm comprising:
    (a) retrieving said cryptogram from a communications channel or storage medium as r retrieved vectors, each of length n symbols,
    (b) multiplying each retrieved vector by a first permutation matrix to obtain a codeword of the Goppa code used in creating the public key scrambled generator matrix, corrupted with no more than t bit errors,
    (c) applying an error correcting decoding algorithm to each corrupted codeword to form r binary codewords of the Goppa code and r binary error vectors,
    (d) multiplying each binary codeword of the Goppa code by a second permutation matrix,
    (e) multiplying each binary error vector by a third permutation matrix,
    (f) deriving a vector of length u+v bits from each permuted binary error vector,
    (g) selecting each v bit vector,
    (h) deriving a k-bit to k-bit demapping ping function and a u bit to u bit demapping function from each v bit vector,
    (i) selecting a mapped binary message vector of length k bits from each permuted codeword,
    (j) demapping each mapped k-bit binary message vector by the k-bit to k-bit demapping function to form r demapped k-bit binary message vectors,
    (k) selecting each u bit vector derived from each permuted binary error vector,
    (l) demapping each u bit vector by the u bit to u bit scrambler demapping function to form r demapped u bit binary message vectors,
    (m) reformatting the r demapped k-bit and u bit binary message vectors by removing appended dummy bits to form the original digital message, wherein each of the steps (a)-(m) are executed on at least one processor.

6. The method of claim 5 in which the k bit demapping function is carried out by an arrangement producing a k-bit binary output vector which is equivalent to a polynomial multiplication, modulo $1+x^k$ of a first polynomial of degree k−1 defined by a k-bit binary input vector and a second fixed polynomial of degree k−1, where k is an integer.

7. The method of claim 5 in which the u bit demapping function is carried out by an arrangement producing a u bit binary output vector which is equivalent to a polynomial multiplication, modulo $1+x^u$ of a first polynomial of degree u−1 defined by a u-bit binary input vector and a second fixed polynomial of degree u−1, where u is an integer.

8. A method of encrypting data according to claim 1 in which the number of errors, the integer s, and the error vector containing s bit errors for each codeword vector are derived from a second stream of scrambled u bit binary message vectors.

9. The method of claim 8, further comprising reconstructing a message from the digital cryptogram by means of a private key algorithm comprising:
    (a) retrieving said cryptogram from a communications channel or storage medium as r retrieved vectors, each of length n symbols,
    (b) multiplying each retrieved vector by a first permutation matrix to obtain a codeword of the Goppa code used in creating the public key scrambled generator matrix, corrupted with no more than t bit errors,
    (c) applying an error correcting decoding algorithm to each corrupted codeword to form r binary codewords of the Goppa code and r binary error vectors,
    (d) multiplying each binary codeword of the Goppa code by a second permutation matrix,
    (e) multiplying each binary error vector by a third permutation matrix,
    (f) selecting a demapped binary message vector of length k bits from each permuted codeword,
    (g) demapping each mapped binary message vector by the inverse of the k-bit to k-bit scrambling function of the reversible mapping function used in encryption to form r demapped k-bit binary message vectors,
    (h) deriving each mapped binary message vector of length u bits from each permuted binary error vector,
    (i) descrambling each mapped u bit binary message vector by the inverse of the u bit to u bit scrambling function of the reversible mapping function used in encryption to form r mapped u bit binary message vectors,
    (j) reformatting the r demapped k-bit and u bit binary message vectors by removing appended dummy bits to form the original digital message,
    wherein each of the steps (a)-(i) are executed on at least one processor.

10. A method of encrypting data according to claim 1 in which the number of errors, the integer s, and the error vector containing s bit errors for each codeword vector are derived from a combination of a u bit scrambled binary message vector and a v bit random number from a random number generator.

11. A method of encrypting data according to claim 10 in which the k-bit to k-bit scrambling function and a u bit to u bit invertible scrambler are derived from the v bit random number.

12. A method of encrypting data according to claim 1 in which a k-bit to k-bit invertible scrambling is carried out by an arrangement producing a k-bit binary output vector which is equivalent to a polynomial multiplication, modulo $1+x^k$ of a first polynomial of degree k−1 defined by a k-bit binary input vector and a second fixed polynomial of degree k−1, where k is a fixed integer.

13. A method of encrypting data according to claim 12 in which a u bit to u bit invertible scrambling is carried out by an arrangement producing a u-bit binary output vector which is equivalent to a polynomial multiplication, modulo $1+x^u$ of a first polynomial of degree u−1 defined by a u bit binary input vector and a second fixed polynomial of degree u−1, where u is a fixed integer.

14. A method of encrypting data according to claim 1 in which each codeword vector of length n bits is from a shortened error correcting code derived by deleting bits in certain fixed positions of each codeword from an error correcting code whose length is greater than n.

15. The method of claim 1, further comprising decrypting the cryptogram.

16. A method according to claim 15 further comprising reconstructing messages from two or more digital cryptograms in which a message is authenticated by satisfying conditions that the same message is reconstructed and the error patterns in corresponding corrupted code words have the same bits in error in no more than a specified number of bit positions.

17. The method of claim 1, further comprising reconstructing a message from the digital cryptogram by means of a private key algorithm comprising:
    (a) retrieving said cryptogram from a communications channel or storage medium as r retrieved vectors, each of length n symbols,
    (b) multiplying each retrieved vector by a first permutation matrix to obtain a codeword of the Goppa code used in creating a public key scrambled generator matrix, corrupted with no more than t bit errors,
    (c) applying an error correcting decoding algorithm to each corrupted codeword to form r binary codewords of the Goppa code,
    (d) multiplying each binary codeword of the Goppa code by a second permutation matrix,
    (e) selecting a mapped binary message vector of length k bits from each permuted codeword,
    (f) demapping each mapped binary message vector by the inverse of the k-bit to k-bit scrambling function of the reversible mapping function used in encryption to form r demapped binary message vectors,
    (g) reformatting the r demapped binary message vectors by removing appended dummy bits to form the original digital message.

18. An apparatus for encrypting data according to claim 1, further comprising a selector operable to select the integer s such that s≤t for each codeword vector.

19. The method of claim 1, wherein the reversible mapping function is a reversible non-linear mapping function.

20. Apparatus for encrypting data by constructing a digital cryptogram by means of a public key algorithm, comprising programmable hardware including:
    (a) a converter operable to convert a message to be sent into binary form and formatting it by appending dummy bits as necessary into an integral number r of binary message vectors of length k bits each;
    (b) an error vector generator operable to randomly generate, for each binary message vector, an associated error vector of length n bits, containing s bit errors;
    (c) a mapping function generator operable to generate an associated reversible mapping function for each binary message vector from the associated error vector, wherein the reversible mapping function uses a k bit to k bit scrambling function that is derived from the associated error vector;

(d) a mapper operable to map each binary message vector into a different mapped binary message vector using the associated reversible mapping function;

(e) a first constructor operable to construct a first generator matrix of a binary code with dimension k with a preselected Galois field whose base field is 2, and a Goppa polynomial whose degree is such that the corresponding binary code provides a t error correcting capability by utilising n–k parity bits;

(f) a second constructor operable to construct a scrambled k×n generator matrix by matrix multiplication, said scrambled generator matrix being the product of a non-singular matrix, said first generator matrix and a first permutation matrix;

(g) a third constructor operable to construct a reduced echelon k×n generator matrix by randomly selecting k independent columns of the scrambled k×n generator matrix according to a second permutation matrix;

(h) an encoder operable to encode each mapped binary message vector by adding rows of said reduced echelon generator matrix according to the 1s in each mapped message vector to form r codeword vectors of length n bits;

(i) an adder operable to add the associated error vector to each codeword vector using modulo 2 arithmetic to form r corrupted codeword vectors; and (j) a former operable to form a cryptogram from the r corrupted codeword vectors.

21. An apparatus for encrypting data according to claim 20, further comprising a permuter operable to use a third permutation matrix to permute the bits of each codeword.

22. The apparatus for encrypting data according to claim 21, further comprising:

(a) a retriever operable to retrieve said cryptogram from a communications channel or storage medium as r retrieved vectors, each of length n symbols, (b) a first multiplier operable to multiply each retrieved vector by a first permutation matrix to obtain a codeword of the Goppa code used in creating the public key scrambled generator matrix, corrupted with no more than t bit errors, (c) an error corrector operable to apply an error correcting decoding algorithm to each corrupted codeword to form r binary codewords of the Goppa code and r error vectors, (d) a second multiplier operable to multiply each binary codeword of the Goppa code by a second permutation matrix, (e) a third multiplier operable to multiply each error vector by a third permutation matrix, (f) a deriver operable to derive from each permuted error vector a demapping function based on a k to k-bit descrambler, (g) a selector operable to select a mapped binary message vector of length k bits from each permuted codeword, (h) a demapper operable to demap each mapped binary message vector by the demapping function to form r demapped binary message vectors, (i) a reformatter operable to reformat the r demapped binary message vectors by removing appended dummy bits to form the original digital message.

23. An apparatus for encrypting data according to claim 20 in which the mapper comprises a shift register arrangement featuring a first shift register with fixed tap positions and a second feedback shift register producing a w bit binary output vector which is equivalent to a polynomial multiplication, modulo $1+x^k$ of a first polynomial of degree k–1 defined by the w bit binary input vector and a second polynomial of degree k–1 defined by the fixed tap positions of the first shift register, where k is an integer.

24. An apparatus for encrypting data according to claim 20 in which the mapper comprises a shift register arrangement featuring a first shift register with fixed tap positions and a second feedback shift register producing a u bit binary output vector which is equivalent to a polynomial multiplication, modulo $1+x^u$ of a first polynomial of degree u–1 defined by the u bit binary input vector and a second polynomial of degree u–1 defined by the fixed tap positions of the first shift register, where u is an integer.

25. An apparatus according to claim 20 in which a passive RFID or barcode system encrypts information securely such that the information can only be retrieved using the private key.

26. An apparatus according to claim 20 using a mobile phone to encrypt information securely onto a 2D barcode such that the information can only be retrieved by a mobile phone using the private key.

27. An apparatus according to claim 20 in which an active RFID system encrypts information and transmits the cryptogram using wireless such that the information cannot be retrieved using a wireless receiver without knowledge of the private key.

28. An apparatus according to claim 20 in which an RFID system encrypts information and transmits cryptograms using wireless such that authentication is provided using a wireless receiver with knowledge of the private key.

29. An apparatus according to claim 20 in which a packet radio system encrypts information and transmits cryptograms using wireless such that authentication is provided using a radio receiver with knowledge of the private key.

30. An apparatus according to claim 20 in which an e-mail or text messaging service encrypts information using a public key and transmits the cryptogram such that the information cannot be retrieved by interception of the transmission without knowledge of the private key.

31. The apparatus for encrypting data according to claim 20, further comprising:

(a) a retriever operable to retrieve said cryptogram from a communications channel or storage medium as r retrieved vectors, each of length n symbols, (b) a first multiplier operable to multiply each retrieved vector by a first permutation matrix to obtain a codeword of the Goppa code used in creating a public key scrambled generator matrix, corrupted with no more than t bit errors, (c) an error corrector operable to apply an error correcting decoding algorithm to each corrupted codeword to form r binary codewords of the Goppa code, (d) a second multiplier operable to multiply each binary codeword of the Goppa code by a second permutation matrix, (e) a selector operable to select a mapped binary message vector of length k bits from each permuted codeword, (f) a demapper operable to demap each mapped binary message vector by the inverse of the k-bit to k-bit scrambling function of the reversible mapping function used in encryption to form r demapped binary message vectors, (g) a reformatter operable to reformat the r demapped binary message vectors by removing appended dummy bits to form the original digital message.

32. The apparatus for encrypting data according to claim 20, wherein the number of errors, the integer s, and the error vector containing s bit errors for each codeword vector are derived from a second stream of scrambled u bit binary message vectors, the apparatus further comprising:
- (a) a retriever operable to retrieve said cryptogram from a communications channel or storage medium as r retrieved vectors, each of length n symbols,
- (b) a first multiplier operable to multiply each retrieved vector by a first permutation matrix to obtain a codeword of the Goppa code used in creating the public key scrambled generator matrix, corrupted with no more than t bit errors,
- (c) an error corrector operable to apply an error correcting decoding algorithm to each corrupted codeword to form r binary codewords of the Goppa code and r binary error vectors,
- (d) a second multiplier operable to multiply each binary codeword of the Goppa code by a second permutation matrix,
- (e) a third multiplier operable to multiply each binary error vector by a third permutation matrix,
- (f) a selector operable to select a demapped binary message vector of length k bits from each permuted codeword,
- (g) a demapper operable to demap each mapped binary message vector by the inverse of the k-bit to k-bit scrambling function of the reversible mapping function used in encryption to form r demapped k-bit binary message vectors,
- (h) a deriver operable to derive each mapped binary message vector of length u bits from each permuted binary error vector,
- (i) a descrambler operable to descramble each mapped u bit binary message vector by the inverse of the u bit to u bit scrambling function of the reversible mapping function used in encryption to form r mapped u bit binary message vectors,
- (j) a reformatter operable to reformat the r demapped k-bit and u bit binary message vectors by removing appended dummy bits to form the original digital message.

33. The apparatus for encrypting data according to claim 20, wherein the integer s is selected such that $s \leq t$ for each codeword vector, the apparatus further comprising:
- (a) a retriever operable to retrieve said cryptogram from a communications channel or storage medium as r retrieved vectors, each of length n symbols,
- (b) a first multiplier operable to multiply each retrieved vector by a first permutation matrix to obtain a codeword of the Goppa code used in creating the public key scrambled generator matrix, corrupted with no more than t bit errors,
- (c) an error corrector operable to apply an error correcting decoding algorithm to each corrupted codeword to form r binary codewords of the Goppa code and r binary error vectors,
- (d) a second multiplier operable to multiply each binary codeword of the Goppa code by a second permutation matrix,
- (e) a third multiplier operable to multiply each binary error vector by a third permutation matrix,
- (f) a first deriver operable to derive a vector of length u +v bits from each permuted binary error vector,
- (g) a first selector operable to select each v bit vector,
- (h) a second deriver operable to derive a k-bit to k-bit demapping function and a u bit to u bit demapping function from each v bit vector,
- (i) a second selector operable to select a mapped binary message vector of length k bits from each permuted codeword,
- (j) a first demapper operable to demap each mapped k-bit binary message vector by the k-bit to k-bit demapping function to form r demapped k-bit binary message vectors,
- (k) a third selector operable to select each u bit vector derived from each permuted binary error vector,
- (l) a second demapper operable to demap each u bit vector by the u bit to u bit demapping function to form r demapped u bit binary message vectors,
- (m) a reformatter operable to reformat the r demapped k-bit and u bit binary message vectors by removing appended dummy bits to form the original digital message.

34. The apparatus for encrypting data according to claim 33, in which the k bit demapping function is carried out by an arrangement producing a k-bit binary output vector which is equivalent to a polynomial multiplication, modulo $1+x^k$ of a first polynomial of degree $k-1$ defined by a k-bit binary input vector and a second fixed polynomial of degree $k-1$, where k is an integer.

35. The apparatus for encrypting data according to claim 33, in which the u bit demapping function is carried out by an arrangement producing a u bit binary output vector which is equivalent to a polynomial multiplication, modulo $1+x^u$ of a first polynomial of degree $u-1$ defined by a u-bit binary input vector and a second fixed polynomial of degree $u-1$, where u is an integer.

36. The apparatus for encrypting data according to claim 20, further comprising a decrypter operable to reconstruct messages from two or more digital cryptograms in which a message is authenticated by satisfying conditions that the same message is reconstructed and the error patterns in corresponding corrupted code words have the same bits in error in no more than a specified number of bit positions.

37. A non-transitory computer-readable storage medium storing computer-executable instructions that when executed perform the method of encrypting data by constructing a digital cryptogram by means of a public key algorithm, comprising:
- (a) converting a message to be sent into binary form and formatting it by appending dummy bits as necessary into an integral number r of binary message vectors of length k bits each;
- (b) for each binary message vector, generating an associated error vector of length n bits, containing s bit errors;
- (c) generating an associated reversible mapping function for each binary message vector from the associated error vector, wherein the reversible mapping function uses a k bit to k bit scrambling function that is derived from the associated error vector;
- (d) mapping each binary message vector into a different mapped binary message vector using the associated reversible mapping function;
- (e) constructing a first generator matrix of a binary code with dimension k with a pre-selected Galois field whose base field is 2, and a Goppa polynomial whose degree is such that the corresponding binary code provides a t error correcting capability by utilising n–k parity bits;
- (f) constructing a scrambled k×n generator matrix by matrix multiplication, said scrambled generator matrix being the product of a non-singular matrix, said first generator matrix and a first permutation matrix;
- (g) constructing a reduced echelon k×n generator matrix by randomly selecting k independent columns of the scrambled k×n generator matrix according to a second permutation matrix;
- (h) encoding each mapped binary message vector by adding rows of said reduced echelon generator matrix according to the 1s in each mapped message vector to form r codeword vectors of length n bits;

(i) adding to the associated error vector to each codeword vector using modulo 2 arithmetic to form r corrupted codeword vectors; and (j) forming a cryptogram from the r corrupted codeword vectors.

* * * * *